Figure 28:
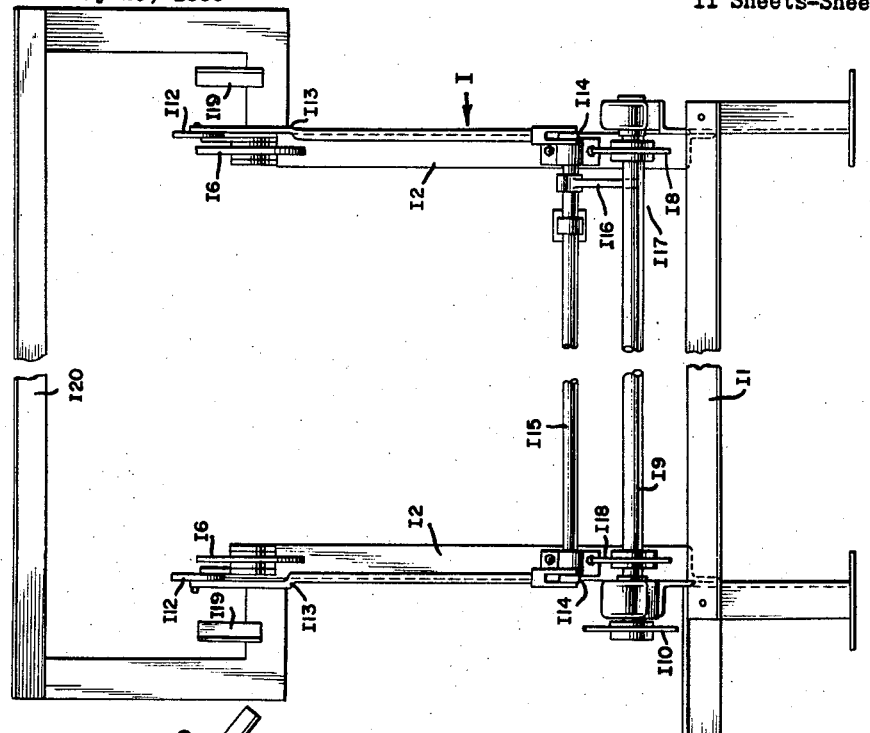

Aug. 23, 1960 W. E. JOHNSON 2,949,919
TOBACCO TREATMENT
Filed July 29, 1955 11 Sheets-Sheet 1
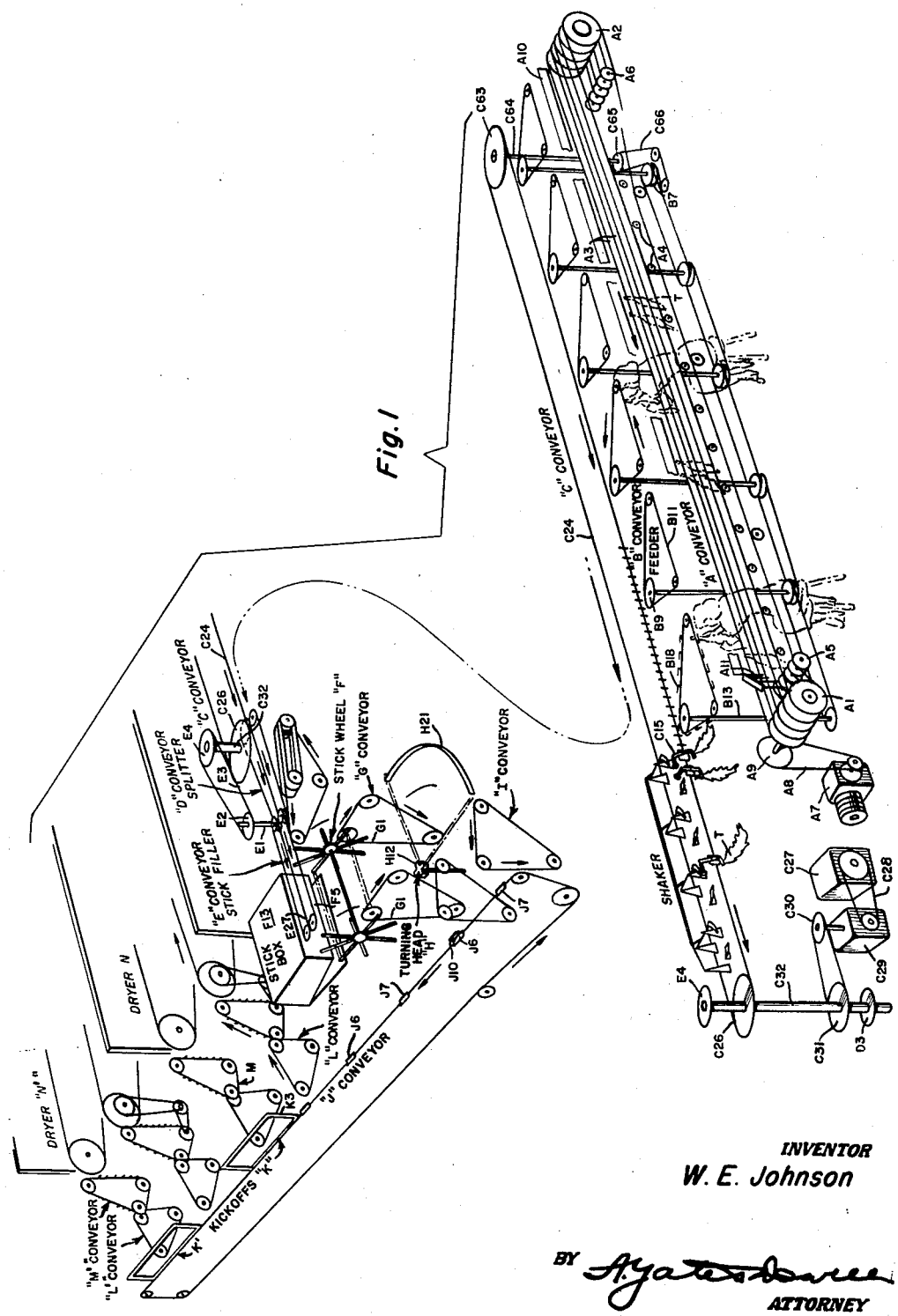
Fig. I
INVENTOR
W. E. Johnson
BY
ATTORNEY

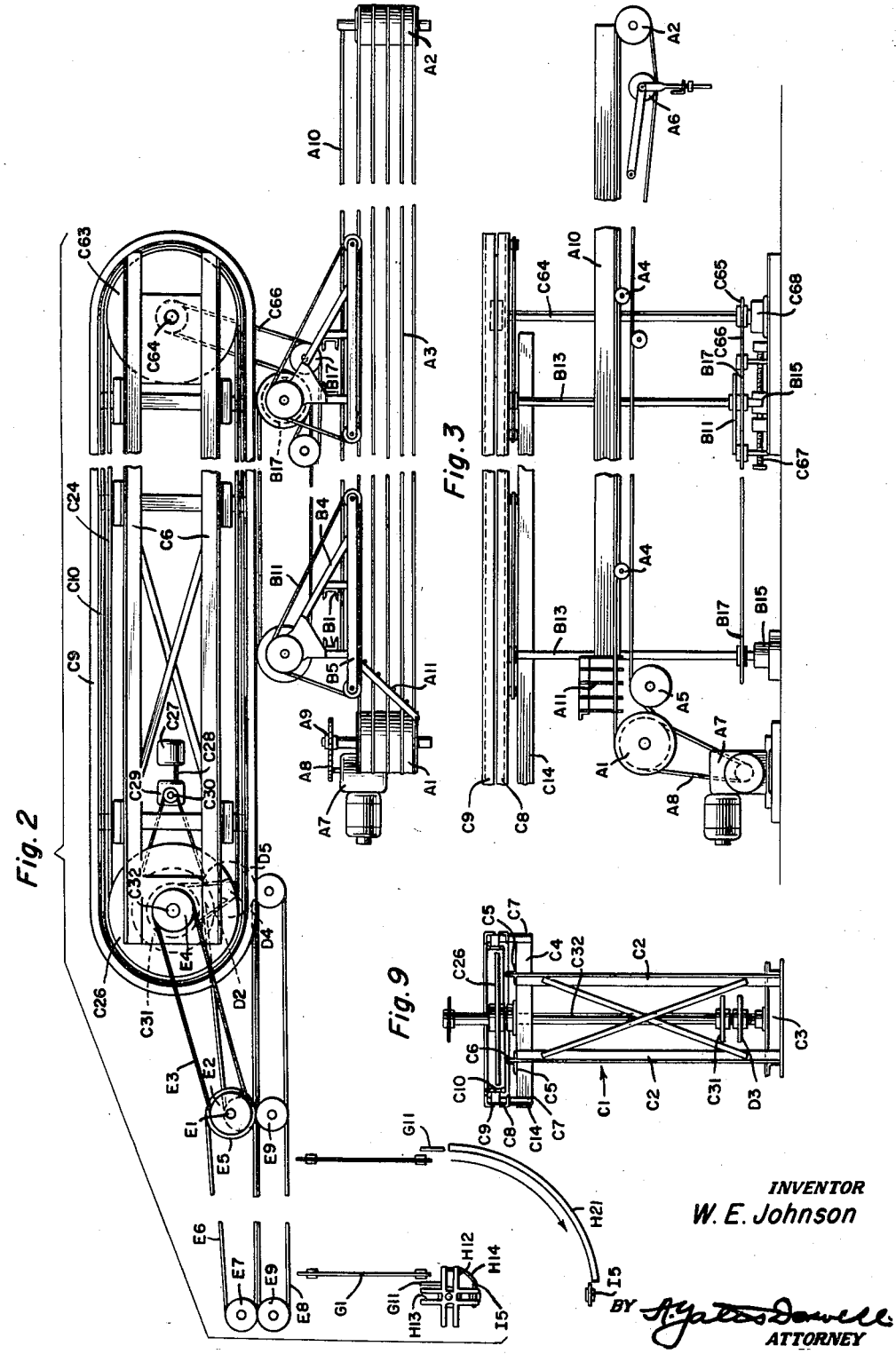

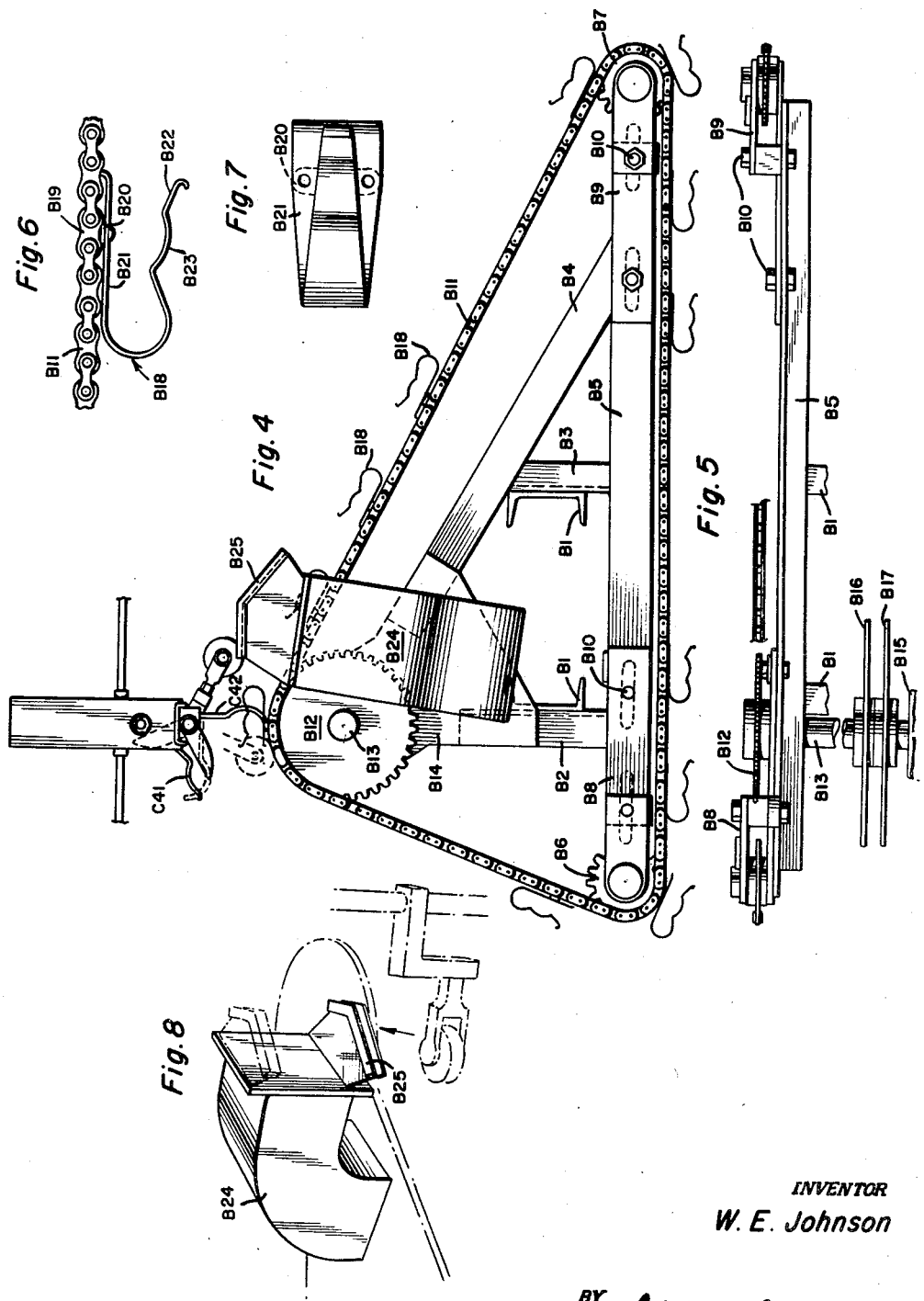

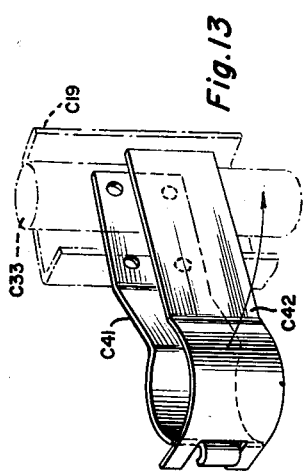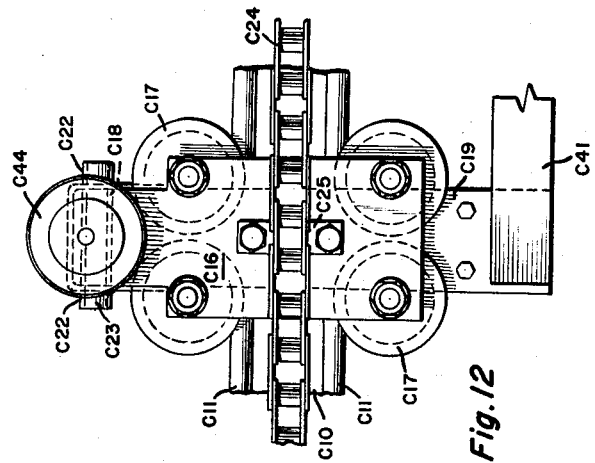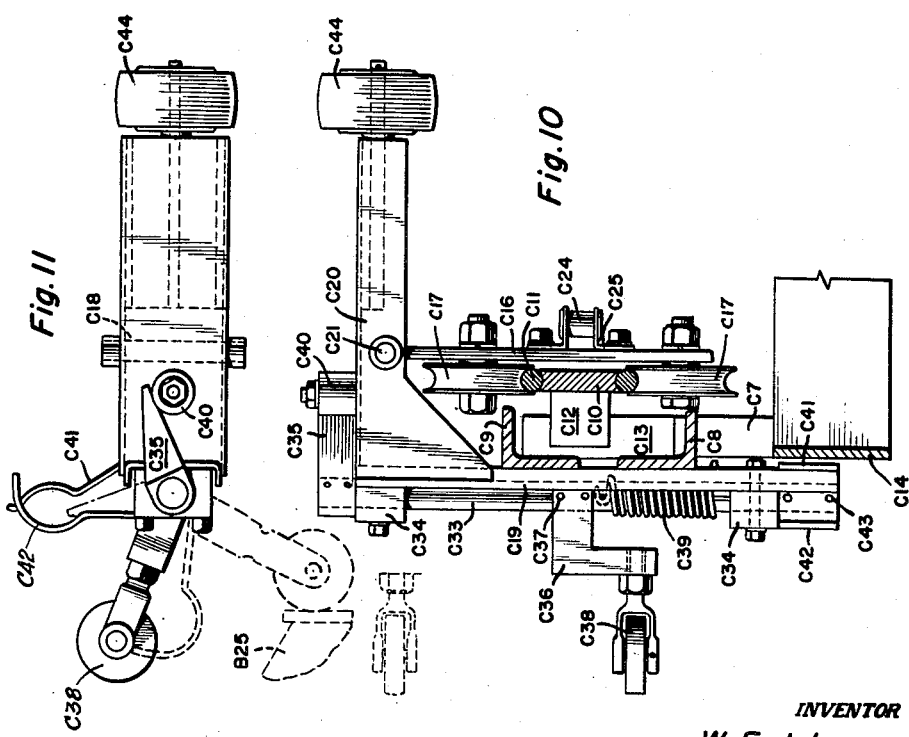

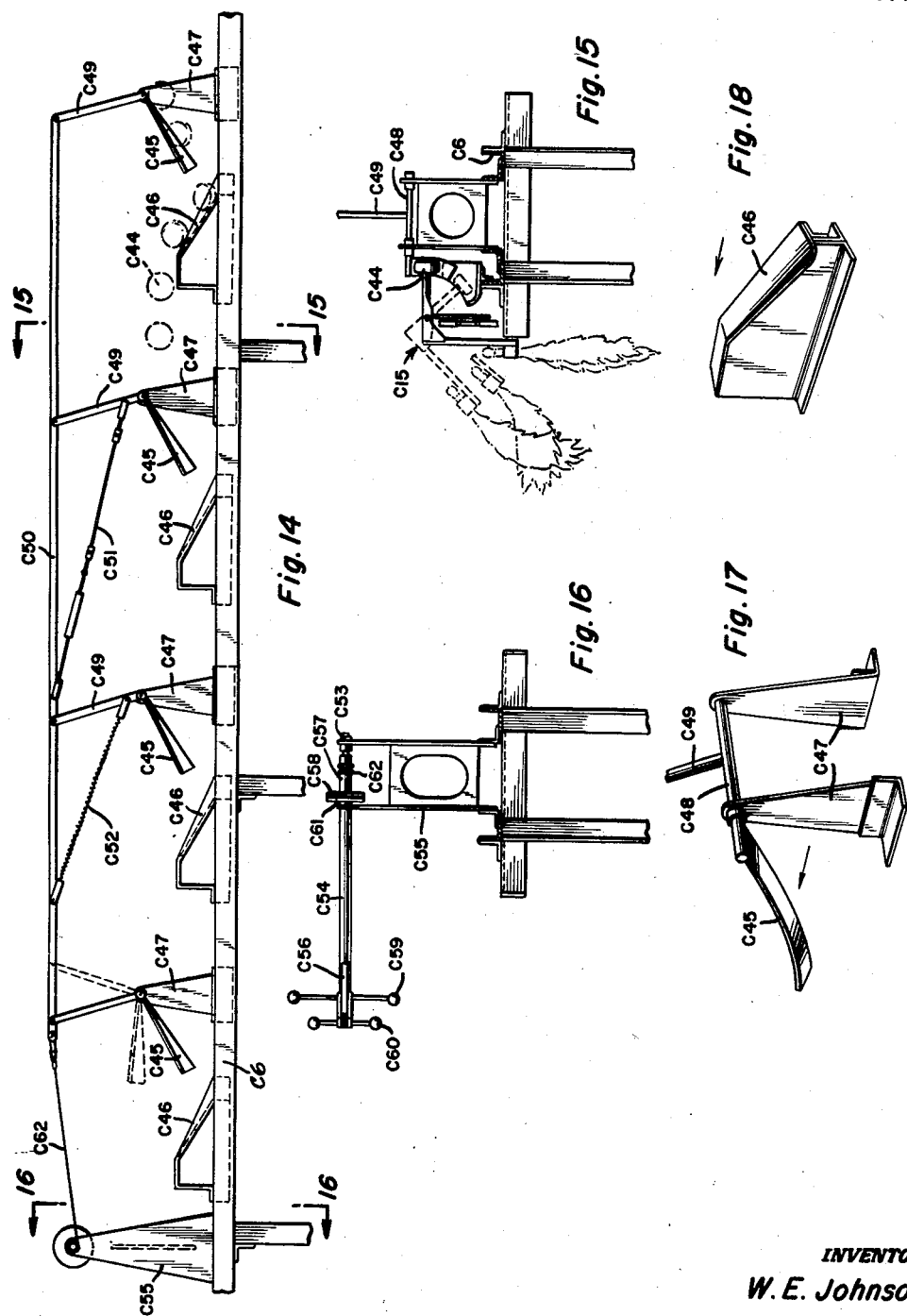

Aug. 23, 1960
W. E. JOHNSON
TOBACCO TREATMENT
2,949,919
Filed July 29, 1955
11 Sheets-Sheet 6
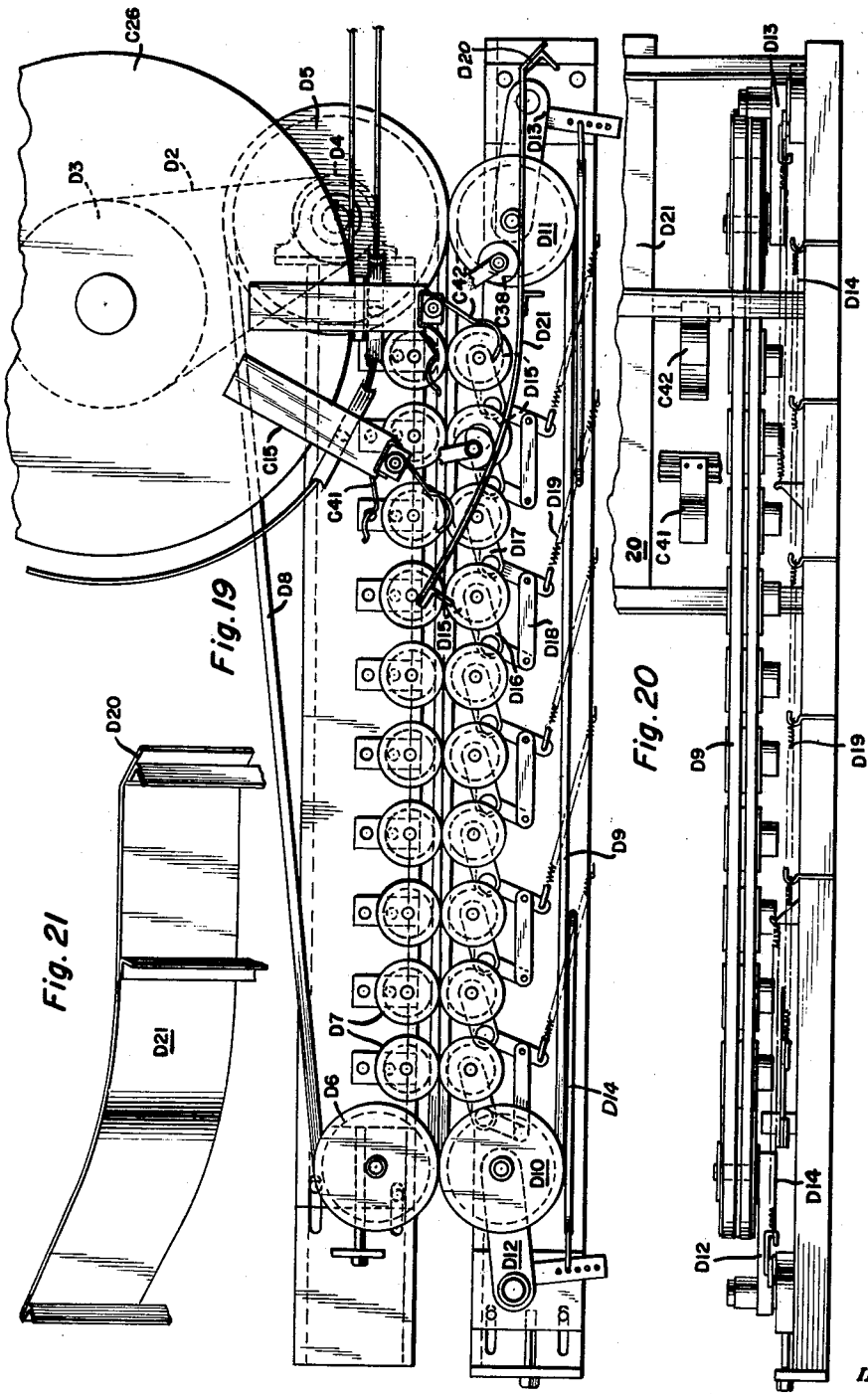
INVENTOR
W.E. Johnson
BY 
ATTORNEY

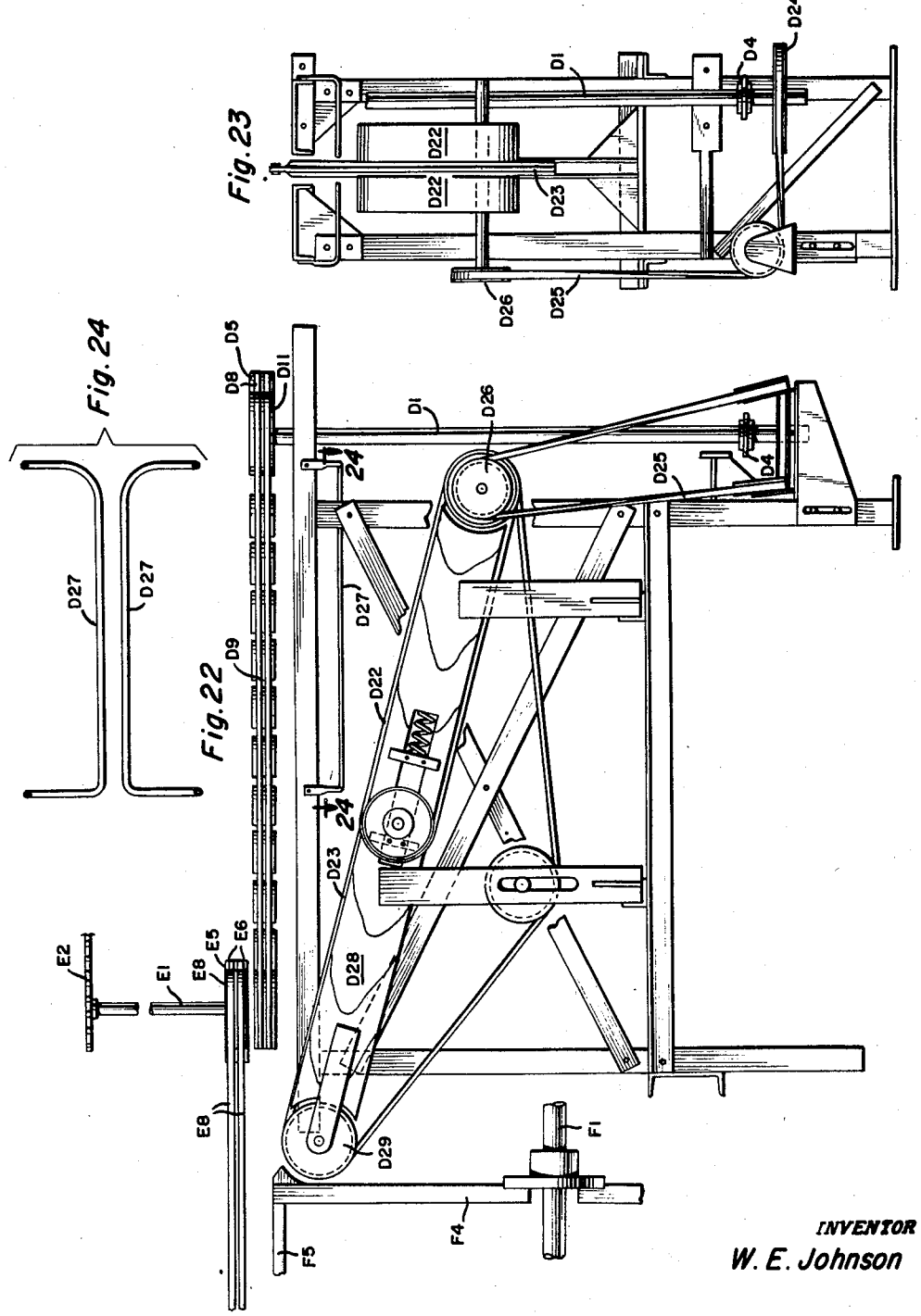

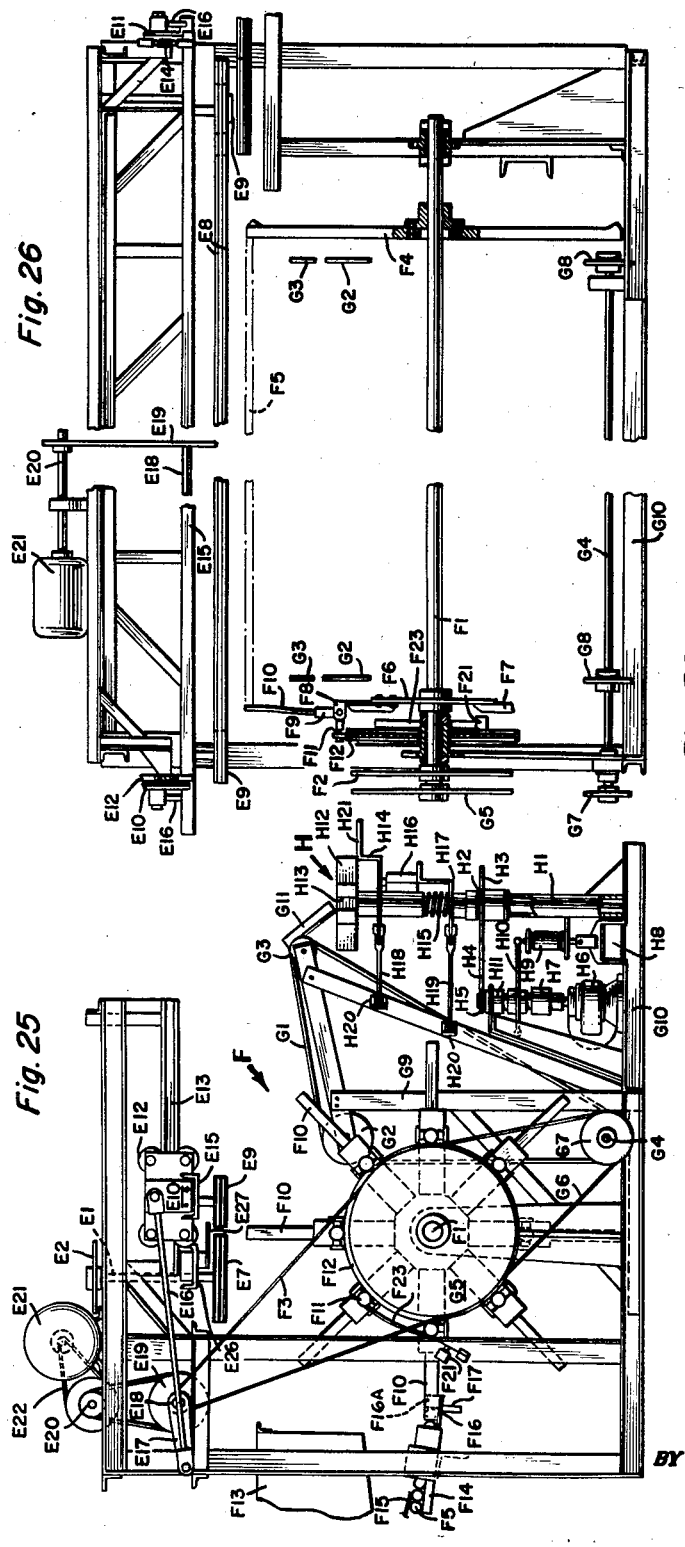

Aug. 23, 1960

W. E. JOHNSON 2,949,919

TOBACCO TREATMENT

Filed July 29, 1955

11 Sheets-Sheet 9

INVENTOR
W. E. Johnson
BY *A. Yates Dowell*
ATTORNEY

Aug. 23, 1960
W. E. JOHNSON
2,949,919
TOBACCO TREATMENT
Filed July 29, 1955
11 Sheets-Sheet 10
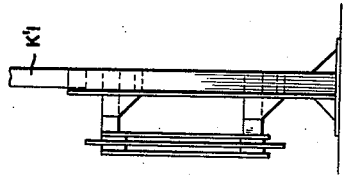
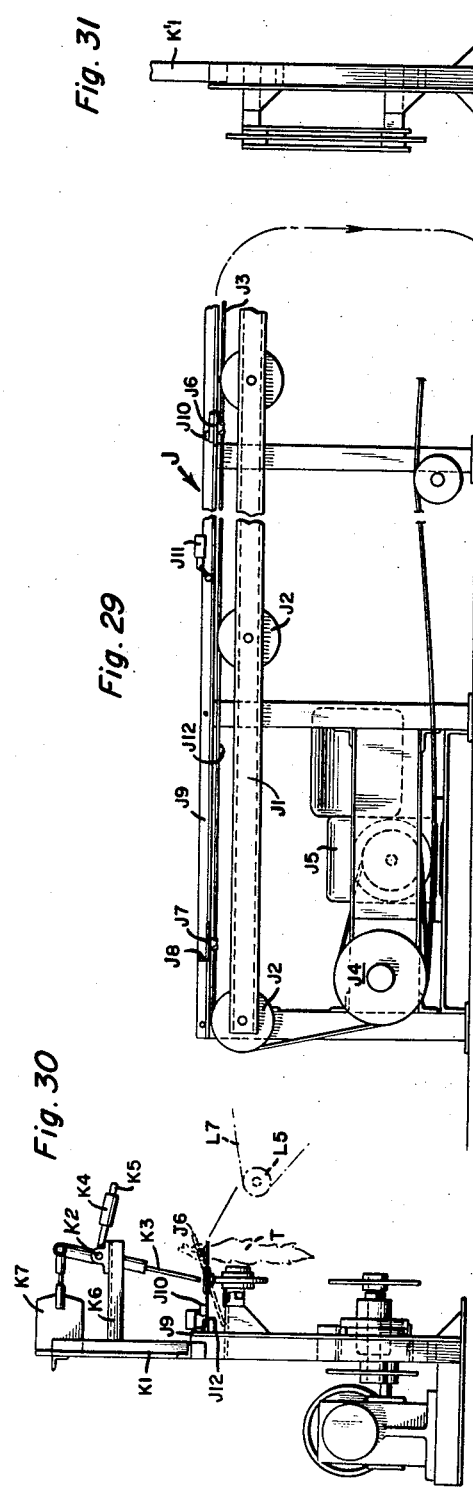
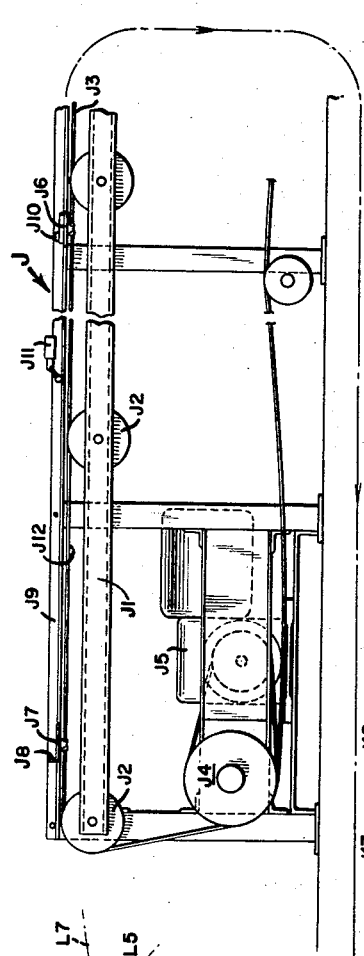
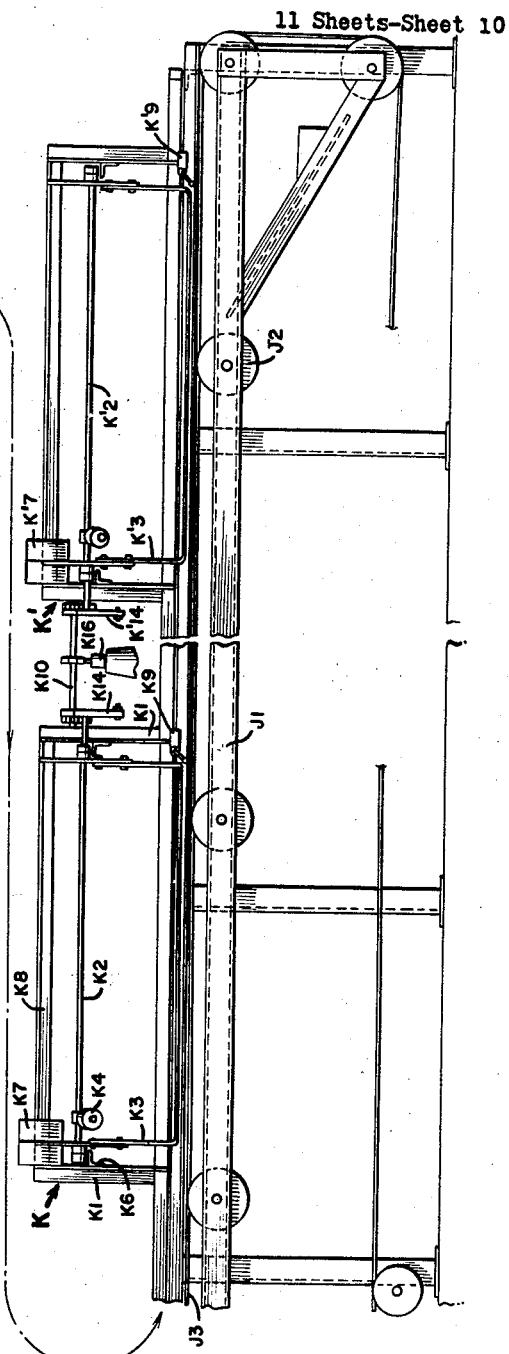
INVENTOR
W. E. Johnson
BY *[signature]*
ATTORNEY Aug. 23, 1960 W. E. JOHNSON 2,949,919
TOBACCO TREATMENT
Filed July 29, 1955 11 Sheets-Sheet 11
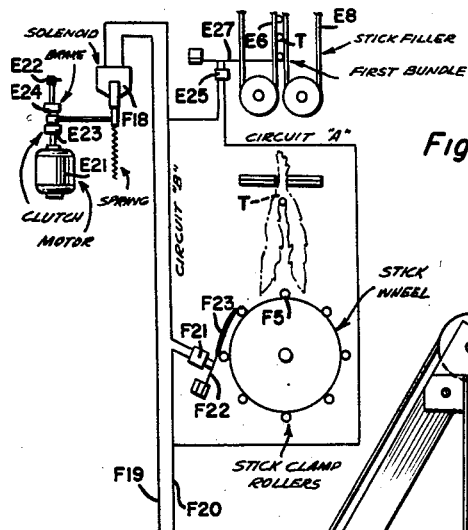
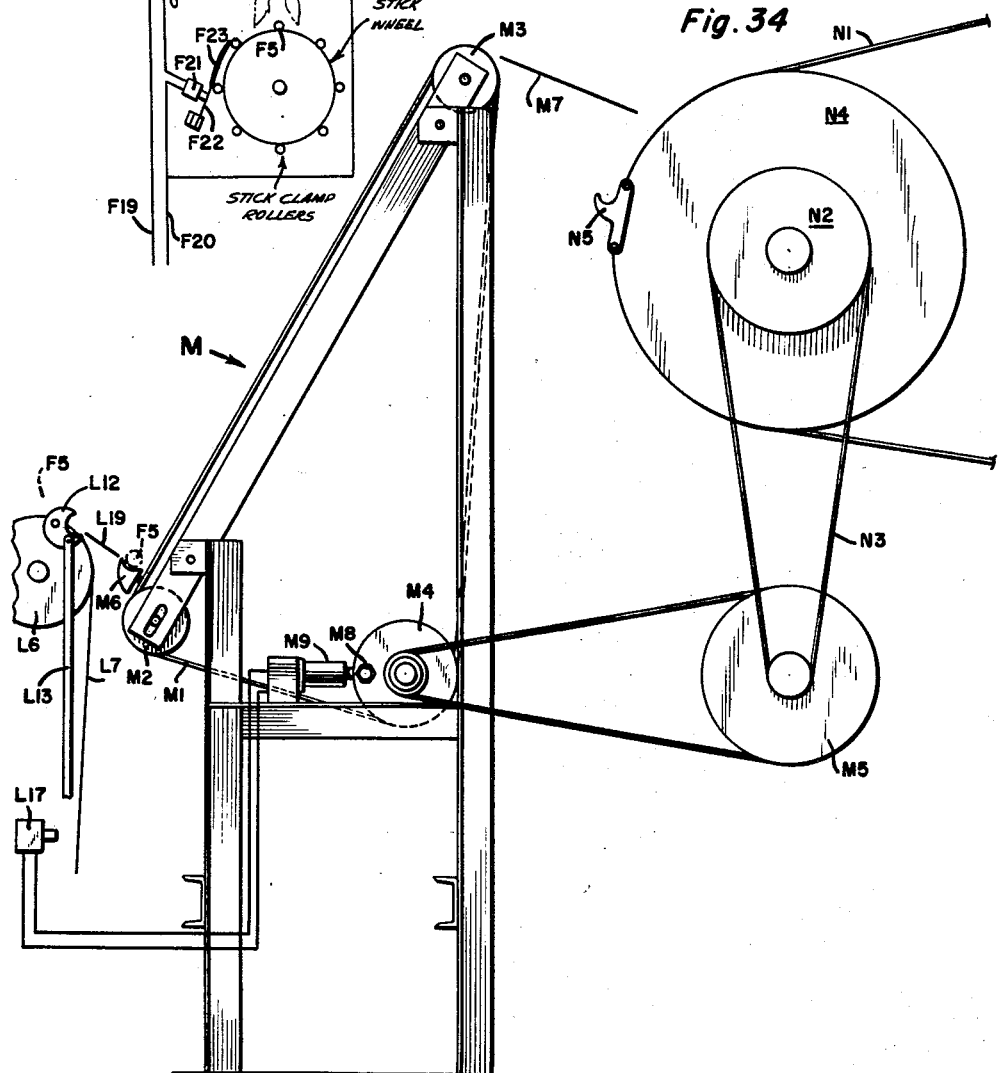
INVENTOR
W. E. Johnson
BY
ATTORNEY United States Patent Office 2,949,919
Patented Aug. 23, 1960

2,949,919

TOBACCO TREATMENT

William E. Johnson, Wilson, N.C., assignor of one-third each to H. D. Hedrick and C. H. Wolf, both of Henderson, N.C.

Filed July 29, 1955, Ser. No. 525,231

11 Claims. (Cl. 131—149)

The present invention relates to tobacco treating equipment and more particularly to equipment for manipulating bundles of tobacco with a minimum of manual labor for processing, or drying tobacco, for example.

Heretofore tobacco has been harvested by collecting the lowermost leaves of the plant as they ripen and fastening such leaves onto sticks by means of string or the like, the filled sticks being placed in a curing barn where heat is applied until the curing is complete. Thereafter the leaves are removed from the sticks, sorted, and graded. The leaves of each grade are tied into bundles of approximately ¼ to ½ lb. and held together by a tying leaf wrapped around the stems, or butt ends of the leaves of the bundle and passing under and between the leaves, being held in place by friction. The bundles (also called hands) are compressed to reduce bulk and transported to a warehouse for sale and thereafter the purchaser dries the tobacco and adds the proper moisture to maintain the tobacco in good condition during the aging process.

To assure the correct amount of moisture substantially all of the moisture is removed from the tobacco in a drying plant and then a small controlled amount of moisture in the form of steam is added, the operation being continuous from the drying of the tobacco to the addition of the necessary small amount of moisture. The buyer then ages the bundles of tobacco in hogsheads and to retain its high quality and remain workable the tobacco must have a small amount of moisture. Too much moisture in a spot causes decay and too little or no moisture causes the leaves to crumble.

Prior to the present invention the feeding of tobacco bundles to dryers has required large amounts of labor, the usual process being to dump quantities of tobacco bundles on a table from which workers grab bundles in each hand, shake each bundle to loosen the leaves and then place the bundles on continuously moving sticks supported on a conveyor. The sticks are 66 inches long and for ideal conditions should support 24 bundles but the number of bundles frequently varies from 20 to as high as 27 resulting in excessive spacing or crowding of the bundles on the sticks, thereby preventing proper drying. The filled sticks are removed from the conveyor and placed on an intermediate conveyor from which workers place the filled sticks on each set of hooks on the conveyor chains of the dryers. These workers are usually rushed and sometimes have to push some bundles together to provide room to grip the stick for handling and then do not have time to arrange the spacing of the bundles. Consequently the bundles are frequently crowded on some sticks and widely spaced on other sticks and some sticks have some crowded bundles and some widely spaced resulting in uneven drying of the bundles and making it impossible to obtain uniform drying and uniform moisture content in the tobacco. Entire hogsheads of tobacco have been lost by rot starting from excessive moisture in some spots and the previously known system of treatment therefore has not been satisfactory. Even though tobacco is not lost the dryers have to be operated at a sufficiently slow speed to dry the most closely positioned bundles thereby reducing the capacity of the dryers with consequent economic loss.

An object of the present invention is to overcome the above difficulties and provide equipment for handling bundles of tobacco with a minimum of manual labor and a maximum efficiency to obtain uniform results throughout the process.

Another object of the invention is to provide equipment which may be operated by unskilled personnel for receiving bundles of tobacco and manipulating and transferring such bundles of tobacco in a pre-selected fashion to treating chambers without additional intervention of workers.

A further object of the invention is to provide means to feed irregularly shaped articles from one location to another for processing.

Another object of the invention is to provide a method of handling tobacco to feed tobacco to a treatment compartment with accurate control throughout the entire operation.

Another object is to provide automatic means for separating leaves in bundles and depositing bundles on sticks.

A further object is to provide an adjustable control means by which the speed of processing tobacco may be accurately controlled so that the tobacco is effectively treated in accordance with its initial condition and the desired final product obtained.

Figure 27:
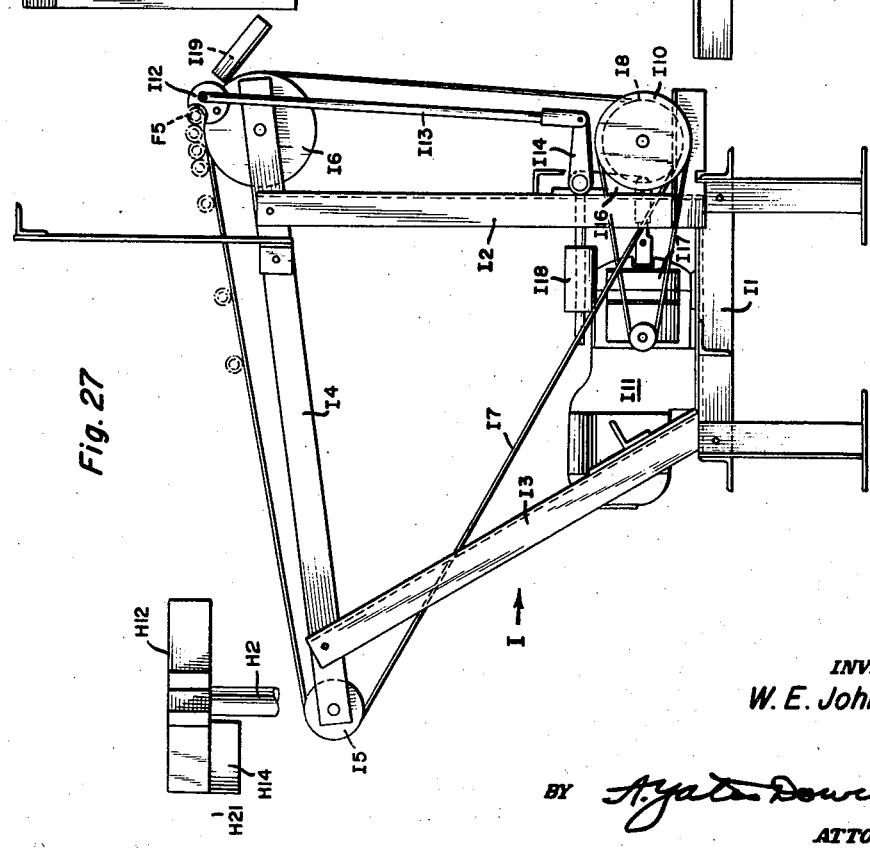

Other and further objects and advantages of the invention will be apparent from the following description taken in conjunction with the accompanying drawings wherein:

Fig. 1 is a schematic broken perspective view of the entire tobacco treatment apparatus and showing fragments of the dryers;

Fig. 2, a plan view of the supply, feeder, gathering and shaking, splitting, stick filling, stick supporting wheel, filled stick discharge conveyor, and turning head, with parts omitted and parts broken away for simplicity;

Fig. 3, an elevation with parts broken away and parts omitted of the supply, feeder, and gathering and shaking conveyors;

Fig. 4, an enlarged plan view of one feeder conveyor showing one gathering hand of the gathering and shaking conveyor in position to gather a tobacco bundle from one of the clips of the feeder conveyor;

Fig. 5, an elevation, with parts omitted and parts broken away, of the feeder conveyor of Fig. 4;

Fig. 6, an enlarged detail in plan of one of the U-shaped spring clips on a broken away portion of the feeder conveyor chain;

Fig. 7, an elevation of the spring clip of Fig. 6;

Fig. 8, a perspective of one of the cams for mounting on each feeder conveyor support for cooperation with a follower which operates a movable clip of the gathering hand of the gathering and shaking conveyor;

Fig. 9 (Sheet 2) a vertical transverse view of the gathering and shaking conveyor looking toward the discharge end thereof and showing the supporting structure and track;

Fig. 10, an elevation of a gathering hand unit mounted on the track shown in section and showing the movable gathering clip operating follower in bundle retaining position;

Fig. 11, a plan view of the pivoted portion of the gathering hand unit;

Fig. 12, a side elevational view of the gathering hand unit looking from the inside of the gathering and shaking conveyor track;

Fig. 13, a fragmentary perspective showing the stationary and movable clips of the gathering hand in bundle retaining position;

Fig. 14, an elevational view of the fixed and adjustable cam arrangement for shaking the gathering hands;

Fig. 15, a fragmentary vertical sectional view taken substantially on line 15—15 of Fig. 14, of the gathering and shaking conveyor showing the fixed and adjustable cams for producing the shaking;

Fig. 16, a vertical section taken substantially on line 16—16 of Fig. 14 showing the adjustable windlass for controlling the adjustable shaking cams;

Fig. 17, a perspective of an adjustable shaking cam showing the supporting pedestal therefor;

Fig. 18, a perspective of a stationary shaking cam;

Fig. 19, an enlarged plan view of the gripping conveyors of the bundle splitting conveyor which spreads the leaves of the tobacco bundles and showing the discharge portion of the gathering and shaking conveyor transferring bundles thereto;

Fig. 20, an elevation of the gripping conveyors of the splitter conveyor;

Fig. 21, a perspective of a cam plate for actuating the movable clip release followers of the gathering hand for releasing tobacco bundles upon transfer to the splitting conveyor;

Fig. 22, a side elevation of the splitter conveyor assembly with parts omitted and parts broken away for clarity;

Fig. 23, an end view of the bundle receiving end of the splitter conveyor assembly of Fig. 22;

Fig. 24, a fragmentary section taken on line 24—24 of Fig. 22 showing the guide rods of the splitter conveyor;

Fig. 25, an end elevation of the stick filler conveyor, stick receiving wheel, the filled stick receiving conveyor, and the turning head for filled sticks;

Fig. 26, an irregular partial vertical section with parts omitted of the stick filled and stick wheel of Fig. 25 showing the movable spoke and cam operating structure for gripping and releasing sticks;

Fig. 27, a side elevation of a utility conveyor for transferring filled sticks from the turning head to a single run conveyor;

Fig. 28, an elevation of the utility conveyor from the discharge end thereof;

Fig. 29, a broken side elevation of the single run conveyor for moving filled sticks longitudinally;

Fig. 30, an end view from the filled stick receiving end of the conveyor of Fig. 29 and showing filled stick kick off structure for laterally discharging filled sticks to a discharge conveyor shown in dotted lines;

Fig. 31, a fragmentary end elevation of the conveyor of Fig. 29 from the discharge end thereof, with parts omitted;

Fig. 32, a schematic perspective view of the filled stick kick off devices showing the electrical operating system therefor;

Fig. 33, a diagrammatic view showing the electrical control system for the stick filling conveyor and stick receiving wheel; and, Fig. 34, a fragmentary side elevation showing the cooperation of a utility conveyor and a drier loading conveyor showing the drier conveyors in operative relation to illustrate the common-timed drive mechanism therefor.

Briefly, the present invention comprises an elongated continuously driven supply or A conveyor formed of a plurality of smooth metallic belts and having a guide board along one edge and a diagonally arranged downwardly extending pronged gate adjacent the discharge end with the prongs extending downwardly into the spaces between adjacent belts. Bundles of tobacco are placed diagonally and transversely on the supply conveyor belts with the butt ends adjacent the guide board, the bundles being retained on the conveyor by the gate until the workers pick them up.

A series of feeder or B conveyors are arranged in spaced relation above and along the supply conveyor with the series being spaced from the feed end of the supply conveyor to provide for easy loading of the supply conveyor from trucks or the like. Each feed conveyor includes an endless chain above the supply conveyor in a generally horizontal plane with U-shaped resilient clips arranged on the outer surface of the chain in groups whereby each worker may place bundles of tobacco in each U-shaped clip from the supply conveyor. A gathering and shaking or C conveyor is formed of a single chain in a generally horizontal plane and is provided with a plurality of gathering hands, each gathering hand being pivotally mounted on a bracket with rollers running on an endless supporting track for gathering bundles from the U-shaped clips of the feeder conveyors, each gathering hand including a stationary clip and a cam operated movable clip, the movable clip being positively moved by a cam into position to engage the upwardly projecting butt end of a bundle of tobacco on the feeder conveyor B to gather and resiliently grip the upwardly projecting end of the bundle against the stationary clip of the gathering hand. Each gathering hand being pivotally mounted on the bracket and guided on the track is positively moved by fixed and adjustable cams to shake each bundle thereby separating the leaves for facilitating drying. This loosening of the leaves may be accomplished by having the leaves run between live rollers mounted on a vertical shaft, the rollers being comparatively flat and disk-like, the edges overlapping imparting a series of bending motions to the leaves.

The bundles are passed to a splitter or D conveyor having resiliently urged opposed endless flexible conveyor belts, upon release from the gathering hand clip by the action of a stationary gathering hand opening cam. The splitter conveyor in addition to the opposed endless conveyor belts includes a pair of conveyors for engaging the downwardly extending leaves and a separation conveyor between said leaf engaging conveyors to split the leaves of each bundle in two approximately equal parts, the butts of the bundles are then engaged by a stick filler or E conveyor including opposed endless belts above the belts of the splitter conveyor and moving at a sufficiently low speed to accommodate a predetermined number of bundles, for example 24. One of the opposed belts can be bodily moved from the other, permitting the bundles to be released from the E conveyor. Beneath the stick filler conveyor E a pair of spaced rimless spoked wheels fixed to an axle parallel to the E conveyor are rotatably mounted and provide a stick wheel for supporting tubular non-corroding tobacco sticks immediately below the gripping portions of said stick filler conveyor so that when the said one belt is separated from the other belt the bundles will be released so as to be supported on the underlying stick. This separation of the belts is controlled by an adjustable switch located in the path of the foremost bundle of a series held in the E conveyor. The bundles T are split up to a little below the point where the belts on the stick filler conveyor E grip them; the friction of the leaves against the tobacco stick normally would prevent any drop at this point. In transferring the filled sticks to subsequent conveyors the bundles may be shaken down an inch or so on the tobacco stick.

Sticks are supplied to the stick supporting wheel F in regular order and cam means cooperating with springs retain and release the sticks, the filled sticks being released on and carried by a stick receiving or G conveyor. From the G conveyor one end of each stick is dropped into a slot in a turning head H the other end of the stick being supported on a turning guide. Switches responsive to the presence of a filled stick in the turning head cause the turning head to operate through a predetermined angle, the stick being thereafter discharged onto a loading or I conveyor designed to retain a plurality of filled sticks and having detent means to limit the discharge therefrom to one filled stick at a time.

A continuously operating single run or J conveyor provided with pairs of spaced stick end receiving shelves controls the detent means of the I conveyor responsive to the closing of a micro switch by the leading stick shelf. The inner edges of the stick shelves are supported by a longitudinal guide member past this loading point. When the stick shelves pass this point the inner edges (to the left as viewed in Fig. 30) may drop downward unless a loaded stick is carried on the outer edges of the shelves. The purpose of the longitudinal member is to hold the inner edge of the stick shelf up, thus exerting enough pressure to close the micro switch and release a loaded stick from the utility conveyor I for dropping a filled stick in proper time for reception by the stick supporting shelves of the J conveyor. The filled sticks are ejected from the shelves of the J conveyor onto discharge conveyors L, L' by electrically controlled ejecting or kick off devices K, K' operatively controlled by longitudinally adjustable switches on the J conveyor and operating in alternate sequence to eject filled sticks to their respective discharge conveyors L, L'. From the discharge conveyors the filled sticks are fed to drier loading or M, M' conveyors which are driven in timed relation and from the same source of power as the conveyors of the drier so that a stick is deposited on each pair of hooks of the drier chain conveyors, the sticks being deposited from the L, L' conveyors on the drier feed conveyors M, M' by cam operated means driven with the drier and controlling the detents on the discharge conveyors L, L'. After the tobacco passes through the drier the sticks are removed from the bundles of tobacco and returned by a suitable conveyor to the stick supply box and reused as the cycle is repeated.

Referring more particularly to the drawings, Fig. 1 diagrammatically illustrates the entire operation with legends to indicate each unit of the apparatus. A supply conveyor A (Figs. 1, 2 and 3) includes a supporting structure (not shown for simplicity) on which drums A1 and A2 are rotatably mounted and over which drums a plurality of endless stainless steel bands A3 pass, being guided by a plurality of supporting rollers A4 and guide rollers A5 and being tensioned by individually adjustable tension rollers A6 suitably mounted for adjustment, whereby each endless band of stainless steel may be maintained in proper supporting relation. The A conveyor is driven from a source of power including a motor and gear reduction unit A7 connected by a chain A8 to a driving sprocket A9 fixed to the shaft of the drum A1 for continuously operating the conveyor in the direction of the arrow. The leaves of tobacco are placed diagonally on the conveyor bands A3 adjacent the supporting drum A2 with the butt ends closely adjacent a guide board A10 at the rear of the conveyor and such leaves are fed continuously and the leading leaves, if not previously picked up, will be stopped by a gate having a plurality of downwardly extending prongs A11 which project into the spaces between adjacent endless bands A3, thereby preventing the tobacco leaves from being discharged from the A conveyor, the endless bands being smooth to permit the bundles to remain stationary without objectionable damage thereto while the endless bands slide under such bundles thereby providing a temporary storage for enough bundles to assure the workers a continuous supply.

A series of feeder or B conveyors (Figs. 1 to 8, inclusive) are mounted upon a suitable supporting structure including uprights B1, at the upper ends of which strut members B2, B3 are mounted and such strut members support diagonal brace B4 and elongated support B5, at the ends of which idlers guide sprockets B6, B7 are mounted for free rotation on suitable bearings in forked extensions B8 and B9 respectively secured to the elongated support B5 by bolts B10 passing through elongated openings in the support member B5 for obtaining proper adjustment to accommodate for variations in the length of an endless conveyor chain B11 which passes over idler sprockets B6 and B7 and over a driving sprocket B12 fixed on a downwardly extending driving shaft B13 rotatably mounted in suitable bearings in a gusset plate B14 fixed to the strut B2 and diagonal brace B4 the lower end of the shaft B13 being mounted for rotation in a bearing B15 in a base structure. Each of the shafts B13 carry a pair of sprockets B16 and B17 by means of which adjacent feeder conveyors B are driven in timed relation, the feeder conveyor B nearest drum A1 having a single sprocket B17 since the power for the feeder conveyors is furnished from the feeder conveyor nearest the feeding end of the A conveyor. Secured to each endless conveyor chain B11 are a plurality of U-shaped resilient clips B18 affixed to a conventional fastener link B19 (Figs. 6 and 7) having outwardly extending ears B20 which are riveted or otherwise suitably secured to one leg portion B21 of the U-shaped clip, the mouth portion of the clip being outwardly flared and an intermediate portion B23 of the other leg being of generally arcuate shape to semi-positively retain the butt ends of a tobacco bundle therein.

Fixed on the gusset plate B14 is a hollow elbow-shaped support B24 which overlies a portion of the driving sprocket B12 and extends above the endless chain B11 and carries a gathering hand opening cam B25 in proper position to engage a roller follower on a gathering hand of a fathering and shaking C conveyor.

The C gathering and shaking conveyor (Figs. 1 to 3, inclusive, 9 to 18, inclusive) includes a plurality of supporting bents C1 formed of uprights C2 extending from a base C3 and having sufficient diagonals for obtaining the desired rigidity. A transom C4 secured to the upper ends of the uprights C2 by any suitable means such as welding or the like supports angle elements C5 fixed to the transom for fixing stringers C6 by bolts or other suitable fastening means, to the underlying supporting bents C1 to properly support the stringers.

Upright angular elements C7 fixed to the ends of the transoms C4 by welding or the like support angle rub bars C8 and C9 by means of angle clips and bolts. A track C10 of strap material with round rods C11 secured to the edges thereof is supported by a strip C12 fixed to an angular element C13 which is attached to upright angle elements C7 attached to rub bars C8, C9 and supported from horizontal members C4, the track being arranged with parallel sides as shown in Fig. 2 and arranged substantially parallel to the supply conveyor A and the series of feeder conveyors B, a rub strip C14 being maintained on the bents on the side thereof adjacent the A and B conveyors to provide a smooth outer rub surface for gathering units C15.

A gathering unit C15 (Figs. 10 to 13, inclusive) includes a plate C16 having a plurality of grooved rollers C17 rotatably mounted on suitable studs and engaging track rods C11 for guidance around the closed path of the track C10, the upper portion of the plate C16 having a tubular hinge knuckle C18. An L-shaped gathering hand support includes a vertically extending channel element C19 affixed to a horizontally extending channel element C20 which is pivoted by means of a pin C21 passing through bosses C22 in channel member C20 and through knuckle C18 being secured in position by a taper pin or the like C23 to permit the gathering hand support to pivot to the dotted line positions shown in Fig. 15, the gathering hand being normally in the position shown in full lines. The gathering hands are moved by means of an endless chain C24 which is connected to the bracket plates C16 by means of connecting links having ears C25 formed on the links and affixed to the plate by any suitable means such as bolts or the like, the chain C24 passing over a driving sprocket C26 which is driven from a motor C27 by means of an infinitely variable belt drive C28 and a gear reduction unit C29 which drives a sprocket C30 on a vertical shaft and by means of a chain passing therearound and over a sprocket C31 on a shaft C32 the conveyor chain C24 with the gathering hands C15 are driven through sprocket C26, the speed being adjustable by means of the infinitely variable speed control which is made of a Boston Reductor AV 65 10/1 ratio MOW 8 variable speed drive complete with pulley and motor base.

A vertically extending stub shaft C33 (Figs. 11 to 13, inclusive) is mounted in bearings C34 affixed to the vertically extending channel member C19 of the gathering unit and carried an arm C35 fixed thereto by means of tapered pins or the like. A cam follower bracket C36 is also affixed to shaft C33 by suitable means such as taper pins, rivets or the like C37, the bracket C36 carrying a roller cam follower C38 adjustably mounted on the bracket by any suitable means such as a forked threaded bolt and a lock nut or the like. A torsion spring C39 surrounding a portion of shaft C33 has one end secured to the shaft and the other end engaging the channel member C19, thereby producing torsion on the shaft C33, urging the arm C35 against a rubber bumper C40 secured to the channel C20 by bolt or the like.

Clip means on the gathering conveyor for removing the bundles or tobacco hands includes stationary clip jaw C41 affixed to the lower end of channel member C19 by any suitable means such as rivets or the like and a cooperating movable clip jaw C42 affixed to the lower end of shaft C33 by any suitable means such as taper or roll pins or the like C43.

A shaking roller C44 preferably of rubber or other resilient material is rotatably mounted on a suitable shaft affixed to the channel member C20 by any suitable means whereby downward engagement of the roller C44 from above will cause the gathering hand to be moved to the dotted line position shown in Fig. 15 to shake the tobacco leaves and separate the same. Each of the gathering hands is substantially the same except for the particular configuration of the cam follower supporting bracket C36 which bracket is designed to support cam follower rollers C38 in six different positions from the position shown in full line in Fig. 10 to the positions shown in dotted lines and four intermediate positions. It will be noted that engagement of cam follower roller C38 with cam B25 (Figs. 4 and 8) will cause the movable gathering clip C42 to assume the full line position shown in Fig. 4, at which time a clip B18 of the B feeder conveyor will be immediately thereabove so that the gathering hand movable clip C42 will engage the butt end of the bundle in the holding clip B18 and cause the butt end of the bundle to be moved to and gripped between the stationary clip C41 and movable clip C42.

As stated above the gathering hand clips C41 and C42 are located below the clips B18 of the B conveyor and when the movable gathering hand clip C42 is moved out of engagement with the stationary clip C41 in a horizontal plane substantially below clips B18 and movable clip C42 engages the bundle of tobacco leaves sufficiently below the clip B18 so that the bundle is partially bowed before being released from clip B18 and is then moved out of the clip B18 by the clip C42 on the faster moving conveyor C. The spring C39 closes the clip C42 when clip C42 is released as the roller C38 runs off cam B25. The clip C42 moves in such as way as to cause the bundle of leaves to bend slightly due to the inertia of the bundle and also due to the fact that clip B18 grips the bundle with sufficient force so that the bowing of the bundle caused by the movement of the clip 42 causes the bundle to be retained on the clip C42 after the bundle is released from the clip B18. From an inspection of the technical data hereinbelow it will be noted that the six conveyors B operate at lower speeds than conveyor C so that each clip B18 of one group of four clips on each conveyor B registers with every sixth clip C41, C42 of conveyor C. One group of twenty-four clips of the five groups of clips on conveyor C takes up the four bundles from one group of four clips B18 on each of the six conveyors B. It will be observed that the timing of the clips is arranged to produce this result as can be understood by persons skilled in the art. The bundle will remain gripped by the gathering hand and carried along by the conveyor chain C24 so that shaking roller C44 will alternately engage adjustable cams C45 and stationary cams C46 thereby producing the shaking action, the fixed cams being mounted on the stringers C6 and the movable cams being pivotally mounted on pedestals C47 by means of rock shafts C48 having arms C49 pivotally connected to a link C50 for obtaining substantially identical adjustments in all cams.

An airplane type control cable C51 provided with an adjustable turnbuckle is connected to one of the arms C49 and the link C50 to adjustably limit the extent of movement of the movable cams C45, the cams being urged to the dotted line inoperative or generally horizontal position (Fig. 14) by means of a tension spring C52 connected between one of the arms C49 and the link C50. The adjustment of the link C50 is accomplished by means of a windlass supported in bearing C53 and an elongated bearing tube C54 suitably mounted on the framework. A shaft C56 is rotatably mounted in bearings C53 and C54 and is affixed to a tubular hub or drum C57 having a friction disk C58 and fixed to the shaft C56 by taper pins, rivets or the like, the shaft C56 being rotated by a hand wheel C59 suitably keyed to the shaft C56 permitting relative axial movement while a locking hand wheel C60 threaded onto a threaded end of the shaft C56 upon relative rotation will cause axial movement of the shaft C56 causing friction disk C58 to be urged tightly against a friction disk C61 fixed to the pedestal C55 thereby locking the drum C57 in adjusted position. A cable C62 having one end fixed to the drum C57 and the other end connected to the link C50 adjusts cams C45 to the dotted line to full line positions and any intermediate position by operation of the windlass to obtain any desired degree of shaking of the bundles of tobacco as shown in Fig. 15.

The conveyor chain C24 is driven by sprocket C26 and passes around a sprocket C63 which is fixed to downwardly extending shaft C64 supported in suitable bearings and having a sprocket C65 at its lower end connected by a chain C66 having its outer surface in contact with sprocket B17 on the rightmost shaft B13, the chain C66 being guided by suitable idler sprockets to maintain the driving relation, the chain C66 to produce movement of the C and B conveyors in the direction indicated by the arrows. The shaft C64 may be adjusted at its base by means of an adjusting screw C67 which is threaded through an abutment fixed to the base and engages an abutment secured to the lower bearing C68 of the shaft C64, the lower bearing C68 being mounted in suitable guideways for this purpose. To maintain shaft C64 in correct position it is necessary to provide some adjustment of the track C10, and angle rub rails C8 and C9 and this may be done by the use of overlapping splicing plates and a plurality of alignable apertures through which countersunk bolts are secured to maintain a flush outer surface, the details of this adjustment being omitted for simplicity. It will be thus seen that the conveyors C and B will be accurately driven in timed relation and can be adjusted for varying the length of the track and the relation of the parts.

The bundles are passed from the C conveyor to the splitter or D conveyor (Figs. 1, 2, 19, 20, 21, 22, 23, 24) the splitter conveyor including supporting framework on which a vertically extending driving shaft D1 is rotatably mounted in suitable bearings and driven from the driving shaft C32 of the C conveyor by means of a chain D2 which is driven from a sprocket D3 on shaft C32 and drives a smaller diameter sprocket D4 on shaft D1, said shaft D1 at its upper end carrying a double groove V-pulley or a pair of V-pulleys D5, a cooperating double groove pulley D6 serving to complete the run and a plurality of idler pulleys D7 maintain B-section belts D8 from sagging. Cooperating with the belts D8 are a similar pair of opposed belts D9 which pass over idler pulleys D10, D11 mounted on bell cranks D12, D13, respectively, and urged into position by adjustable springs D14 to cause belts D9 and D8 to engage one another but permit separation thereof upon the entrance of material such as the bundles of tobacco.

Along the run of belts D9 adjacent belts D8 are a plurality of idler rollers D15 which are rotatably supported on bell cranks D16, D17 having their full arms connected by links D18 and urged by springs D19 acting on extensions of bell cranks D17 to pivot the bell cranks about their pivots urging the idler rollers and thereby the adjacent run of the belts D9 into yieldable engagement with belts D8 so that bundles of tobacco may be firmly gripped and fed by the belts D8 and D9.

The gathering units C15 of the C conveyor pass around the driving sprocket C26 at approximately the same time that the bundles of tobacco reach the D conveyor the butts of such bundles being gripped by the fixed and movable clips C41, C42 and released when passed into the mouth formed by the pulleys D5 and D11 of conveyor D and immediately thereafter being gripped by belts D8 and D9. The follower roller C38 of the gathering hand engages the sloping surface D20 of a curved cam plate D21 supported above the D conveyor by suitable uprights which do not interfere with the movements of the rollers or bundles. The engagement of the follower roller C38 with the cam plate D21 causes the movable clip C42 to be separated from the stationary clip C41 thereby releasing the bundles from the clips so that the bundles may be fed by the gripping action between belts D8 and D9, the belts D8 and D9 being operated at a sufficiently high speed to draw the bundles of tobacco out of the path of the rapidly moving gathering hands C15 and feeding such bundles to the stick loading or E conveyor.

Beneath the conveyor belts D8 and D9, the splitter conveyor D is provided with a pair of inclined conveyor belts D22 on either side of a narrow inclined belt conveyor D23, all of such conveyors D22, D22 and D23 being driven from the shaft D1 through a pulley D24, belt D25, suitable idler pulleys and a pulley D26 fixed to an axle carrying drums or other drive wheels for driving the conveyors D22 and D23. The tobacco leaves being suspended from the belt conveyors D8 and D9 engage the conveyors D22 and D23 but are controlled by guide rods D27 having a converging mouth to maintain the tobacco leaves in proper position, the belt D23 extending substantially below the center of the bundles so that the leaves are spread apart and straddle the inclined conveyor D23 and its supporting board D28 which carries a guide pulley D29 at its upper end, the slack in the belts being taken up by suitable means. From the splitter conveyor D the bundles of tobacco pass to a stick filler conveyor E.

The E or stick filler conveyor (Figs. 1, 2, 22, 25, 26) includes a driving shaft E1 having a sprocket E2 fixed thereon and driven by a chain E3 from a sprocket E4 fixed to the upper end of shaft C32. Extending around a double V-pulley E5 fixed on shaft E1 are a pair of B-section belts E6 guided by an idler pulley E7 at the opposite end thereof while opposed to such conveyor belts E6 is another pair of B-section conveyor belts E8 passing over idler guide pulleys E9, E9 mounted on a framework including brackets E10, E11 carrying pulleys E12 riding on tracks E13, E14 fixedly carried by a supporting framework, the brackets E10 and E11 carrying a suitable supporting channel E15 at the opposite ends of which channel the pulleys E9, E9 are carried and support the movable belt E8, for lateral bodily movement away from belts E6, suitable guide rollers including spring pressed rollers where necessary similar to conveyor D being provided for guiding belts E6, E8 to effectively retain the bundles of tobacco until the desired time for discharge.

The framework including brackets E10, E11 and channel E15 is mounted for rectilinear movement on rollers E12 and provide for movement of the conveyor belts E8 away from conveyor belts E6 to release the bundles of tobacco therefrom, this movement being accomplished by a pair of pitmen E16, E16, connected to cranks E17, E17 on opposite ends of a crank shaft E18 driven by a sprocket E19 fixed thereon from a sprocket on an idler shaft E20 driven from a continuously operating electric motor E21 which drives a sprocket chain E22 through a clutch E23 (see Fig. 33); the chain drive being stopped by a brake E24 when the clutch is released. The operation of clutch E23 and release of brake E24 is initiated by a longitudinally adjustable switch E25 mounted on a fixed portion of the frame such as a channel E26 and having a blade E27 in the path of the butt end of the first bundle so that the first bundle to engage the blade E27 for operating switch E25 will cause the separation of conveyor belts E8 from conveyor belts E6 to release the bundles from conveyor belts E6 and E8 so the bundles are supported on the underlying stick, it being understood that 24 bundles will be supported between the conveyors E6 and E8 in proper spaced relation until E8 is separated 16 inches to fully clear the bundles supported on the stick wheel F during transfer to the discharge conveyor G. The proper spacing of bundles is obtained by suitably arranging the drive speeds of the various conveyors.

Supported below the E conveyor is the stick wheel F which includes a shaft F1 rotatably mounted in a suitable framework and driven from a sprocket F2 by means of a chain F3 driven from a sprocket fixed on crank shaft E18 so as to produce ⅛ rotation of shaft F1 upon a complete rotation of shaft E18. Fixed to the shaft F1 is a first wheel F4 having a plurality of spokes to frictionally support one end of an aluminum pipe F5 which serves as a tobacco stick. Each spoke of wheel F4 is tapered on the entering side to a plow point to assist guiding the spread leaves on the stick F5. A second wheel F6 is fixed to the shaft F1 adjacent the other end thereof, also carrying a plurality of spokes F7 each having laterally extending ears F8 between which a two-armed lever F9 is pivoted carrying a spring stick engaging leaf F10 on one arm thereof and a cam follower roller F11 on the other arm thereof, such cam follower roller being engageable with a fixed cam track F12 fixed to the supporting framework whereby the spring leaf F10 will be moved from a position out of engagement with a stick F5 to a position engaging and retaining one end of a stick F5 while urging the other end of the stick against the corresponding spoke of the wheel F4 thereby retaining the stick F5 in position. Sticks are supplied from a stick box F13 to the horizontally extending spokes of the wheels F6 and F4 by means of a stick supporting guide F14 on which the sticks F5 are supported and guided in a single layer by means of a strip of belting F15 engaging the upper surfaces of the sticks to limit the sticks to a single layer and end guides as required. The outermost stick is supported on a relatively narrow apron F16 having a stop F16a which supports the outermost stick F5 in proper position for engagement by spokes of the wheel F4 and the aligned leaf spring F10, a suitable trigger-like cam F17 being mounted in proper position to engage the leaf spring F10 and release such leaf spring at the correct instant so that the leaf spring F10 will properly engage the end of the outermost stick F5 resting against the stop on the apron F16, thereby gripping the stick, the cam F12 permitting the leaf spring F10 to be moved by its resiliency into stick engaging position at that instant and the trigger cam F17 being adjustable, if desired, to accurately control the instant of final movement of the leaf spring F10.

It will be apparent that the shaft F1 and the wheels carried thereby are moved in timed relation, ⅛ of a turn at a time by the controlled operation of the brake E24 and clutch E23 (Figs. 26 and 33) so that a stick is supported immediately below the tobacco bundle engaging location of the conveyors E6 and E8 when the conveyor E8 is moved outwardly to release the bundles and thereafter the filled stick F5 carrying the bundles is moved to the next clockwise position where the cam F12 is designed to release the filled stick onto a receiving or G conveyor.

Referring to Figs. 25, 26 and 33, the motor E21 is continuously operated and drives a chain E22 through a clutch E23 which is controlled by a solenoid F18 which is connected to switch E25 thereby completing a circuit to a source of power F19, F20, through suitable leads. It will be apparent that when the blade E27 is moved by the first bundle T of a group the motor E21 through clutch E23 and sprocket and idler shaft drives the crankshaft E18 which immediately causes conveyor E8 to be moved away from conveyor E6, but as soon as the pressure between conveyors E6 and E8 is released the pressure of the leading bundles of tobacco T permits the blade E27 to return to its initial position thereby opening switch E25, the bundles of tobacco T then being supported on the underlying stick.

Since it is essential that the crankshaft E18 make a complete revolution to move the stick wheel ⅛ of a turn it is necessary to provide a holding switch F21 (Fig. 33) which is actuated by a blade F22 secured to the framework and carrying a cam extension F23 which is normally out of engagement with projections such as the rollers F11, but as soon as the stick wheel starts to rotate the cam extension F23 engages one of the rollers and remains in engagement therewith until the stick wheel has made ⅛ of a revolution so that the cam extension F23 lies in the space between the next adjacent follower rollers F11 thereby permitting the stick wheel to stop, the brake E24 stopping the stick wheel at the precise time, the brake being applied by a spring and released by the solenoid F18 which solenoid when actuated causing the clutch E23 to be engaged and the brake E24 to be released.

It will be apparent that the cam extension F23 may be operated by any suitably spaced projections on the stick wheel or on an element positively rotated in timed relation therewith. It is considered preferable to have a sharp following edge on the wheel so that the spring pressed cam follower extension F23 may be rapidly restored to its inoperative position thereby causing switch F21 to be opened and stop the stick supporting wheel in the exact position for the bundles of tobacco T to be released from conveyor E while straddling the underlying stick F5 and then be supported by the stick. The horizontally extending arm of the two armed lever is preferably of a square to trapezoid shape and cam follower F23 may engage therewith to obtain the accuracy required.

The sticks are discharged from between the spokes of wheel F4 and the spring stick engaging leaf springs F19 and are received by a pair of conveyor chains G1, G1 passing over idler guide pulleys G2, G3 and a drive pulley mounted on a shaft G4 driven from a sprocket G5 on shaft F1 by means of a chain G6 driven from sprocket G7 fixed on the shaft G4. Drive sprockets G8, G8 cooperate with the conveyor chains G1, G1, to drive the conveyor. It will thereby be apparent that the receiving conveyor G is driven a definite distance for each increment of movement of the stick wheel F and in timed relation therewith, the conveyor G1 being mounted on spaced triangular shaped frameworks G9 suitably supported on a base G10, which base also supports a stick turning head H into which the sticks are guided by angle guides, G11, G11.

The turning head H includes a tubular support H1 extending upwardly from the base G10 and rotatably supporting a shaft H2 having a sprocket H3 fixed thereon and driven by means of a chain H4 from a sprocket H5 fixed on a shaft driven from a continuously operating motor and reduction gear drive H6 through a clutch H7 which is operated by a solenoid H8 which overcomes a spring H9 to move a lever H10 downwardly so that immediately upon energization of the solenoid H8, the shaft H2 will be driven and immediately upon de-energization of solenoid H8 the compression spring H9 will urge the lever H10 upwardly to apply a brake H11 to stop the rotation of shaft H2. The shaft H2 carries upon its upper end a turning head H12 (Figs. 2 and 25) having a plurality of stick receiving slots H13 radiating from the shaft H2, the inner ends of such slots having a cam formation to accurately guide the sticks when they drop from the angle guide G11 adjacent thereto.

The end of the stick in the turning head is supported upon an adjustable cam H14 secured to a tube surrounding the shaft H2 for rotary and axial movement and being of sufficient length to support the said end of the tobacco stick being turned. The outer edge of cam H14 being an upstanding arcuate shaped flange of sufficient length for the turning movement required for engagement with the said end of the stick F5. As shown in the drawing the turning head H12 is designed to rotate one quarter of a revolution but it can be made to produce any desired rotation up to 270 degrees or more, if desired. The cam H14 being vertically slidable on the shaft H2 against the tension of an adjustable compression spring H15 will move downward slightly when a filled stick is dropped in the slot H13 thereabove due to the weight of the stick, the downward movement of the cam H14 serving to close a microswitch H16 mounted on an adjustable bracket H17, the angular positions of the cam H14 and microswitch H16 may be adjusted by means of the threaded yokes H18 or H19 respectively by the adjustment of nuts H20 thereon which engage an angular abutment on the frame member G9. The other end of the filled stick F5 in the turning head is supported on an arcuate-shaped guide H21 for the duration of the turning movement, such guide H21 being made of sufficient size to carry the said other end of a filled stick from the conveyor G to a conveyor I. The turning head H12 is stopped in accurate position to receive the next filled stick, the stick which has just been turned being dropped onto a utility conveyor I. The stick wheel F and turner H can be designed for right or left hand operation as desired to accommodate the equipment in existing plants.

The conveyor I (Figs. 1, 27, 28) includes a supporting base I1 on which is mounted a pair of uprights I2, and struts I3, I3 carrying inclined transoms I4, I4 on which idler sprockets I5, I5 and I6, I6 are mounted in spaced relation with clear space between the similar elements to permit tobacco bundles to pass when supported on a tobacco stick, the idler sprockets supporting conveyor chains I7, I7 which are driven from sprockets I8, I8 fixed on a shaft I9 and driven from a sprocket I10 from a continuously driven motor gear reduction unit I11, whereby the chains I7 will carry the filled sticks from the turning head H upwardly to a position above the idler sprockets I6 where the furthest advanced filled stick will be stopped by detents I12, I12 which are pivotally mounted for rocking movement to control the discharge of a single filled stick F5 and retain following sticks against discharge, the detents I12 being operated by links I13 connected to arms I14 fixed on a shaft I15 having an arm I16 fixed thereto and moved in timed relation by a solenoid I17 which rotates shaft I15 against the bias of an adjustable counterweight I18 on an arm which urges the detent to full line position. The solenoid I17 is energized by the single run J conveyor onto which filled sticks are discharged, by means of suitable guides I19, I19.

It will be evident that vertically movable rods such as I13 may project above the conveyor chains I7, I7 and control the discharge of a single stick F5 since the sticks are spaced from one another by the engagement of the tobacco leaves even though several sticks accumulate on the I conveyor the solenoid being energized for sufficiently short time. The inclined transoms I4, I4 are accurately maintained in spaced relation by a U-frame I20 which maintains the transoms in proper spaced relation from the I conveyor.

The single run J conveyor includes a supporting framework having a plurality of uprights and longitudinal stringers or rub strips J1 which carry a plurality of idler guide wheels J2 over which a conveyor chain J3 passes being continuously driven by a sprocket J4 from a motor gear reduction unit J5. The conveyor chain J3 carries a plurality of pairs of stick receiving shelves including a leading shelf J6 and a following shelf J7 in each pair (Figs. 1, 29, 30, 31), the leading shelf J6 being adapted for rocking movement from the full line position shown with a filled stick mounted thereon to the dotted line position (Fig. 30) which would occur when there is no filled stick on the shelf J6 and the following shelf J7 being somewhat similar but having a rear upwardly projecting stop J8 to engage the end of a filled stick to positively feed such filled stick forwardly. The leading shelf J6 when unloaded in the dotted line position and out of contact with the horizontal portion of angular guide J9 but is maintained against the angular guide J9 as shown when a filled stick is present, the leading shelf J6 being provided with a cam projection J10 extending the length of the shelf and engageable with an operating roller on a longitudinally adjustable normally open switch J11. However, when a filled stick is present, the leading shelf J6 is moved to its substantially horizontal full line position and maintained in such position by a strip of metal J12 which underlies the guide J9 adjacent the location of the switch J11 so that the upwardly extending projection J10 will be in the path of the operating roller of switch J11 and positively close such switch J11, the switch J11 being connected to operate the solenoid I17 to move the detent I12 of the I conveyor to discharge a single filled stick on the adjacent pair of conveyor shelves J6 and J7.

The filled sticks are removed from the shelves J6, J7 by means of ejecting or kick off devices K, K' (Figs. 1, 29-32 inclusive) which are mounted on the supporting framework of the J conveyor. Extending upwardly from the support of the J conveyor are a pair of uprights K1, K1 on which a shaft K2 fixedly carrying a U-shaped frame K3 is urged to the full line position by counter weight K4 which is adjustable along a supporting arm K5 fixed to the shaft K2, the shaft K2 being supported in suitable bearings mounted on angle members K6 extending from uprights K1. The U-frame K3 is operated to ejecting position by solenoid K7 mounted on a connecting angle K8 extending between uprights K1, K1. The ejectors or kick off devices K and K' are designed to alternately eject a filled stick and this is accomplished by interconnecting means including a normally open switch K9 which is actuated by the projection J10. A similar switch K'9 is connected to solenoid K'7 which operates the U-shaped ejector K'3. A timing shaft K10 is rotatably mounted in suitable bearings (not shown) and carries a rachet K11 which is operated by a lever and pawl K12 pivoted on shaft K10 and connected by a link K13 to an arm K14 fixed on the shaft K2 whereby each actuation of the U-shaped frame K3 will cause the rachet K11 to be moved one step. Similarly, the shaft K10 is rotated by rachet K'11 actuated by the lever and pawl K'12 connected by a link K'13 to an arm K'14 fixed on the shaft K'2 so that each actuation of the U-shaped frame K'3 will cause a step of rotation of the shaft K10. Fixedly mounted on the shaft K10 is a cam K15 which actuates a normally closed switch K16 which is actuated by a follower engaging the high and low portions of the cam K15, the arrangement of rachets K11 and K'11 being such as to move the cam K15 from a low point to a high point for each step of rotation caused by the movement of either frame K3 or K'3. Assuming that the switch K16 is open by the follower's being on the high point of the cam K15 and a pair of shelves carrying a filled stick are moved past the switch K9, the switch K9 will be closed by engagement of the cam projection J10 on the leading shelf engaging against the actuating roller of the switch K9, but no movement of U-shaped frame K3 occurs because of switch K16 being open and therefore the filled stick moves on until the projection J10 of the leading shelf engages the roller operated switch K'9 and immediately upon closing of such switch K'9 the solenoid K'7 is actuated moving the frame K'3 and ejecting the filled stick onto a discharge conveyor L', the movement of frame K'3 causing the rachet K'11 to move one step until the follower operating switch K16 is received in a low spot of the cam K15, thereby causing the switch K16 to be closed. Consequently, when the next pair of shelves J6, J7 carrying a filled stick pass under the switch K9, the switch K9 will be closed by the cam projection J10 which will complete a circuit from one of the power lines through switch K9, through switch K16 to solenoid K7 and from solenoid K7 to the other power line actuating solenoid K7 to move U-frame K3 and eject the filled stick onto conveyor L and the process will be repeated alternately by actuation of U-frames K'3 and K3 ejecting filled sticks on conveyors L' and L. If ejector K' is not being used a switch arranged in short with switch K16 may be kept closed so that each stick is ejected by kick off K. However if it is desired to eject all the sticks by kick off K', then the switch K16 may be kept open in any manner or a switch arranged in series with switch K9 and kept open thereby rendering kick off K inoperative. Such variations may be desirable where a single drier is used.

The conveyors L' and L are substantially similar to the I conveyor and corresponding parts of the L' and L conveyors will be identified by the same numeral as the I conveyor with the exception of the preceding letter L or L' and upon reference to Figs. 30 and 34, the idler sprockets L5, L6 carrying continuously driven conveyor chain L7 supporting filled stick F5 which is retained against discharge by the detents L12 which are actuated by links L13 by a suitable solenoid, the detents L12 being shown in the position of having just discharged a stick F5 over a guide L19 onto the M or drier feed conveyor, the detent L12 holding back any other fill sticks until another stick can be received in the stick receiving recess of the detent L12. The links L13 and detents L12 are operated by a solenoid L17. From the conveyors L and L' the filled sticks are transferred to the conveyors M and M' which include a supporting framework carrying conveyor chains M1 passing over idler pulleys M2, M3 and a driving pulley M4 which is driven from a source of power M5 which also drives the drier conveyor chains N1 through a sprocket N2 chain N3 and a conveyor chain supporting sprocket N4, the conveyor chains N1 having a plurality of stick engaging hooks N5 which are arranged to receive filled sticks from hooks M6 on conveyor chain M1 when such pass over the sprocket M3 and discharge a filled stick F5 onto the guides M7, the chains M1 and chains N1 being driven in accurately timed relation to accomplish this action. The driving sprocket M4 carries a pin M8 which actuates a microswitch M9 which is connected to the solenoid L17 and to a source of power for actuating the detent L12 at the correct instant to discharge a filled stick F5 onto the conveyor hooks M6, thereby providing for filling each pair of hooks N5 on the conveyor N1 of the driers.

*Operation*

From the above description it is believed that the operation of the apparatus should be obvious. The bundles of tobacco T are placed on the right end of the conveyor A with the bundles diagonally arranged with the butt or stem ends thereof adjacent to or in contact with guide board A10 and fed to the operators who grasp bundles and place such bundles into U-shaped clips B18 on the adjacent B or feeder conveyor, six of such feeder conveyors B being shown and would require six operators. When an excess number of bundles are supplied and the A conveyor is filled, the leading-most bundle will engage the prongs A11 of a fixed gate thereby retaining the bundles of the continuously moving substantially frictionless moving blades of the A conveyor to assure a continuous supply to the operators.

The tobacco bundles T are removed from the feeder conveyors by means of gathering hands C15 moved by a conveyor chain C24 and guided on a suitable track, the gathering hands having fixed and movable clips for engaging the upwardly extending stems of the tobacco bundles T. The tobacco bundles when gripped in the gathering hands C15 are shaken by suitable cams C45, C46 and thereafter are carried to a splitter conveyor D between the two pairs of opposed B-section belts D8, D9 the bundles being released from the gathering hand C15 by a cam plate D21 for operating the movable clip at the proper instant to release the bundle to avoid tearing of the tobacco thereon.

The downwardly extending leaves of each bundle engage a pair of conveyor belts D22, D22 and a narrow splitter belt D23 therebetween which serves to split or separate the downwardly depending leaves into opposed sections which straddle the splitter belt. The bundles are then fed to a stick filler conveyor E formed of two pairs of opposed B-section belts with one pair of belts E6 being mounted for operation in a fixed location while the other pair of belts E8 is mounted for transverse bodily movement away from belts E6 to release the tobacco bundles T supported therebetween on to a supporting stick F5 which is mounted on the stick wheel F, the conveyor E8 moving a sufficient distance so that the tobacco bundles will clear conveyor E8 upon rotation of the stick wheel and allow the filled stick to be deposited on the G conveyor, the movable conveyors E8 being returned to opposite position at the proper time.

The A conveyor is continuously driven from a source of power A7. The B, C, D, and E conveyors are driven from a common source of power C27 having an infinitely variable drive such as a split pulley and belt drive C28 driving a reduction gear C29 for driving shaft C32 of the C conveyor by suitable sprockets. This control permits the speed of operation to be varied in accordance with the dampness of the tobacco, the size of bundles, the length of the driers, etc. to obtain ideal conditions.

From the D conveyor the bundles are fed to the stick filler conveyor E and between the conveyor belts E6 mounted for operation in a fixed position and the transversely movable belts E8. It will be evident from the above description that conveyors B, C, D, and E are driven in timed relation and the speeds are adjusted so that 24 bundles will be supported on the E conveyor at the time that the conveyor belt E8 is moved away from the conveyor belt E6 to release the bundles onto the stick F5 therebelow.

It will be observed that each B conveyor has three groups of four clips with a vacant space between each group of clips and similarly the C conveyor has five groups of 24 gathering hands with spaces therebetween. It is believed to be apparent that the purpose of the spaces between the groups of clips and the groups of gathering hands is to provide a time interval so that each group of 24 bundles will be spaced from the following group of 24 bundles as such bundles are passed through the splitter D conveyor and the stick filler E conveyor. As the bundles are fed through the D conveyor the bundles are split by the endless conveyor D23 to a point closely adjacent the E conveyor belts, the split bundles being moved on to the stick F5 in straddling relation while an appreciable amount of friction exists between the bundles and the stick F5 and when 24 bundles have been conveyed to the stick F5, the conveyor belt E8 is moved away from the conveyor belt E6 so that the tobacco bundles T are released and remain straddled and supported on the stick F5, the filled stick F5 being moved by the stick wheel to a position for release of the filled stick onto the G conveyor, the spacing between the groups of bundles permitting this operation to occur before the leading bundle of the next group is fed to the following stick F5 which has been carried by the following pair of arms of the stick wheel F to the position for receiving the next group of bundles.

The stick wheel F, the separation of conveyor belts E8 from conveyor belts E6 and the operation of conveyor G are all operated from a common drive (Fig. 33) which is actuated by the adjustable leaf spring E27 engaging the leading bundle of tobacco T in conveyor E which actuates switch E25 initiating the operation, the continuation of the operation being controlled by the spring pressed cam leaf spring F23 which operates switch F21, the operation being accurately controlled.

From the conveyor G the filled sticks F5 are dropped so that one end of each stick enters a slot H13 in the turning head H12 while the other end is supported on a curved track H21. The turning head H12 is operated by engagement of the stick with the underlying cam H14 which actuates switch H16 until the stick drops off the cam H14 and also drops off the guide H21 onto a continuously moving conveyor I. The conveyor I is provided with discharge preventing detents I12, I12, the detents being released in timed relation by engagement of a cam strip J10 on the leading shelf J6 of a single run conveyor J, the cam J10 cooperating with a longitudinally adjustable switch J11 which controls the detents so that a filled stick is dropped onto shelves J6 and J7 carried by the single run J conveyor. The filled sticks being carried to the ejector or kick off device K or K', such kick off devices being alternately operated by a ratchet control mechanism (Fig. 32) and longitudinally adjustable switches K9 and K9' whereby the alternate sticks are disposed on continuously operating conveyors L and L' respectively such conveyors being similar to conveyor J and having detent means to prevent discharge, such detent means being controlled in timed relation for transfer of filled sticks F5 to lifting conveyors M and M' respectively which are driven from a common source of power which also drives the drier conveyor chains in the dryer N', suitable timing mechanism being provided including solenoid means for operating the detents L12, L12 control from a cam pin M8 on a sprocket M4 controlling a solenoid L17 similar to the solenoid I17.

The various conveyors are made bodily adjustable so that accurate feeding can take place at the point of disengagement of the tobacco bundles from one conveyor and the engagement of the tobacco bundle with the other conveyor, the conveyors being arranged in overlapping relation with one conveyor above the other to accomplish this operation without any loss of control of the moving tobacco bundle T. One suitable design of the B and C conveyors including the technical information is listed below:

|  | B Conveyor | C Conveyor | Ratio B/C |
| --- | --- | --- | --- |
| Number of Conveyors | 6 | 1 | 6/1 |
| Number of links | 216 | 1,080 | 1/5 |
| Pitch of links | ½" | 1" | 1/2 |
| Number of bundle holding clips in group | 4 | 24 | 1/6 |
| Number of groups of clips | 3 | 5 | 3/5 |
| Spacing between clips center to outer | 6" | 6" | 1/1 |
| Number of chain links in each group | 48 | 144 | 1/3 |
| Number of links between groups | 24 | 72 | 1/3 |
| Speed of conveyor feet per minute | 45 | 270 | 1/6 |

The sticks F5 are preferably 66 inches long and the conveyor chains of the G, I, K, L, M and N conveyors are spaced apart 58 inches, the tobacco lying within this space, the chains being supported so that the supporting structure does not interfere with the tobacco leaves.

From the above disclosure it will be evident that applicant has provided an efficient apparatus and method for controlling the operation for performing the tobacco handling operation.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A conveying system comprising a feeder conveyor including an endless chain, U-shaped clips mounted on said endless chain and projecting outwardly therefrom for receiving bundles, means to drive said feeder conveyor in the direction of the free ends of the legs of the U-shaped clips thereof, a gathering conveyor including an endless chain arranged with one run adjacent a portion of said feeder conveyor, means to drive said gathering conveyor so that the adjacent run thereof moves in the same direction as and at a higher speed than the adjacent portion of the feeder conveyor, said gathering conveyor having clip means mounted thereon with said clip means including cooperating jaws, at least one jaw projecting outwardly from said gathering conveyor and overlapping the associated U-shaped clip of the feeder conveyor at the said adjacent portion of said feeder conveyor at predetermined times with the legs of the U-shaped clip and at least one jaw being open in the said direction of movement and in substantial alignment in the region of said adjacent portion for simultaneously contacting a bundle received in the associated U-shaped clip in the path of at least one jaw, and means to synchronize said feeder conveyor with said gathering conveyor so that each U-shaped clip of said feeder conveyor positions the bundle carried thereby in the region of said at least one jaw of the associated clip means whereby the article will be transferred from the feeder conveyor to the gathering conveyor.

2. The invention according to claim 1 in which a plurality of feeder conveyors are provided to feed articles to a single gathering conveyor, said feeder conveyors operating at a sufficiently slow speed to permit manual insertion of articles in said U-shaped clips, said gathering conveyor being driven at a sufficiently high speed to supply bundles to other bundle handling equipment whereby bundles may be supplied at a higher rate to bundle treating equipment than from one feeder conveyor.

3. The invention according to claim 2 in which the conveyors are driven from a common source of power and means are provided to vary the speed from said source of power to said conveyors for accommodating the speed of movement of bundles to the treating equipment.

4. A conveyor system including a plurality of low speed feeder conveyors and a high speed gathering conveyor, means to support articles on said low speed conveyor and means on the high speed conveyor to withdraw articles from the low speed conveyors and arrange them in order, and means to feed the articles from the high speed conveyor to a treatment plant in regular sequence, and common variable speed drive means for operating said feeder conveyors and said gathering conveyor, said feeder conveyors being provided with clips for gripping flexible articles and the gathering conveyor being provided with gripping members for removing the flexible articles from the feeder conveyors and gripping the articles, said gathering conveyor also having means for forcibly moving the gripping members for flexing the flexible articles.

5. A gathering hand comprising a plate, means to mount the plate for movement in a predetermined path, an L-shaped support having two arms and a knee, said support being pivotally mounted on one of its arms on said plate at a location spaced from the knee, a shaft pivotally mounted on the other arm, a cam follower mounted on said shaft and engageable with a cam to rotate said shaft in one direction, a spring to urge said shaft in the opposite direction, a stop to limit the movement in said opposite direction, a fixed clip mounted on said other arm of said support, a cooperating movable clip fixed to said shaft and cooperable with said fixed clip to grip an article therebetween, a roller mounted on the free end of said one arm of said L-shaped support and engageable with cams to forcibly pivot said support about the pivotal connection between said plate and said support whereby an article supported by said clips will be forcibly shaken.

6. A gathering hand comprising a plate, means to mount the plate for movement in a predetermined path, an L-shaped support having two arms and a knee, said support being pivotally mounted on one of its arms on said plate at a location spaced from the knee, a shaft pivotally mounted on the other arm, a cam follower mounted on said shaft and engageable with a cam to rotate said shaft in one direction, a spring to urge said shaft in the opposite direction, a stop to limit the movement in said opposite direction, a fixed clip mounted on said other arm of said support, a cooperating movable clip fixed to said shaft and cooperable with said fixed clip to grip an article therebetween, and means to move the gathering hand.

7. A gathering conveyor including a track defining a path, a plurality of gathering hands mounted on said track, each gathering hand comprising a plate, means to mount the plate for movement in a predetermined path, an L-shaped support having two arms and a knee, said support being pivotally mounted on one of its arms on said plate at a location spaced from the knee, a shaft pivotally mounted on the other arm, a cam follower mounted on said shaft and engageable with a cam to rotate said shaft in one direction, a spring to urge said shaft in the opposite direction, a stop to limit the movement in said opposite direction, a fixed clip mounted on said other arm of said support, a cooperating movable clip fixed to said shaft and cooperable with said fixed clip to grip an article therebetween, a roller mounted on the free end of said one arm of said L-shaped support and engageable with cams to forcibly pivot said support about the pivotal connection between said plate and said support whereby an article supported by said clips will be forcibly shaken, means to move said gathering hands in definite timed relation, a plurality of feeder conveyors arranged along the path of movement of said gathering hands, each of said feeder conveyors having means to support an article with a portion of the article projecting in the path of the movable clip of said gathering hand whereby said gathering hand will remove an article from the adjacent feeder conveyor and transfer such article in securely gripping relation between the movable and stationary clip of the cooperating gathering hand whereby a plurality of persons may load the feeding conveyors for transfer to a single gathering conveyor for further treatment at a rate higher than the workers could apply the articles to the gathering conveyor.

8. A gathering conveyor including a plurality of gathering hands, each gathering hand comprising a plate, means to mount the plate for movement in a predetermined path, an L-shaped support having two arms and a knee, said support being pivotally mounted on one of its arm on said plate at a location spaced from the knee, a shaft pivotally mounted on the other arm, a cam follower mounted on said shaft and engageable with a cam to rotate said shaft in one direction, a spring to urge said shaft in the opposite direction, a stop to limit the movement in said opposite direction, a fixed clip mounted on said other arm of said support, a cooperating movable clip fixed to said shaft and cooperable with said fixed clip to grip an article therebetween, a roller mounted on the free end of said one arm of said L-shaped support, and cam means along the path of said conveyor for engaging the roller mounted on the one arm of said L-shaped support for forcibly shaking the L-shaped support and any article supported therein.

9. A conveyor system including a plurality of low speed feeder conveyors and a high speed gathering conveyor, means to support articles on said low speed conveyor and means on the high speed conveyor to withdraw articles from the low speed conveyors and arrange them in order, and means to feed the articles from the high speed conveyor to a treatment plant in regular sequence, and common variable speed drive means for operating said feeder conveyors and said gathering conveyor, said low speed conveyor being provided with clips opening in the direction of movement of the conveyor and the high speed conveyor being provided with clips opening in the direction of movement of the high speed conveyor with the gripping portion of the clips of the high speed conveyor located below the clips of the low speed conveyor whereby material carried by the clips of the low speed conveyor will be transferred to the high speed conveyor.

10. The invention according to claim 9 in which the clips on the low speed conveyor are spring clips of U-shaped configuration and the clips on the high speed conveyor are formed of two clip elements in which one clip element is an elongated arm pivotally mounted for movement about a vertical axis and controlled to be positioned in a trailing position with respect to the material in its associated low speed conveyor clip immediately prior to engagement with the material to positively and effectively remove the material from the low speed clip and bring the material into gripping engagement with the other clip element of the high speed conveyor.

11. Apparatus for handling hands of tobacco comprising a plurality of loading conveyors having clips opening in the direction of movement of the loading conveyors, a receiving conveyor for removing hands of tobacco from the loading conveyors, hand engaging gripping elements on said receiving conveyor for engaging hands of tobacco in a clip on one of said loading conveyors and removing such hand of tobacco therefrom and positively retaining it on the receiving conveyor, means to shake the hand engaging gripping elements on the receiving conveyor to separate the leaves in the hands, a splitter conveyor for removing hands of tobacco from said receiving conveyor, plow means to separate some leaves of each hand from other leaves in the same hand while the hands are supported in said splitter conveyor, a stick filler conveyor for receiving hands of tobacco from said splitter conveyor, a stick wheel mounted below said stick filler conveyor for supporting a stick between the said leaves and the said other leaves of the hands of tobacco, means for actuating the stick filler conveyor for dropping the hands of tobacco from said stick filler conveyor onto a stick supported on said wheel, means to move a filled stick from said stick wheel to a tobacco dryer conveyor without manual handling thereof whereby the filled sticks will be arranged in successive positions on said dryer conveyor to assure uniform drying in the dryer.

References Cited in the file of this patent

UNITED STATES PATENTS

| | | |
|---|---|---|
| 265,832 | Komp | Oct. 10, 1882 |
| 334,150 | Winterwerber | Jan. 12, 1886 |
| 650,587 | McCartney | May 29, 1900 |
| 835,590 | Witeford | Nov. 13, 1906 |
| 937,906 | Witaker | Oct. 26, 1909 |
| 1,057,636 | Grauer | Apr. 1, 1913 |
| 1,079,218 | Curtis | Nov. 18, 1913 |
| 1,362,893 | Paylor | Dec. 21, 1920 |
| 1,729,671 | Bell-Irving | Oct. 1, 1929 |
| 1,957,727 | Perkinson | May 8, 1934 |
| 2,095,872 | Hurxthal | Oct. 12, 1937 |
| 2,152,965 | Kersey | Apr. 4, 1939 |
| 2,192,518 | Eissmann | Mar. 5, 1940 |
| 2,325,862 | Jepson | Aug. 3, 1943 |
| 2,379,117 | Touton | June 26, 1945 |
| 2,387,160 | Loney | Oct. 16, 1945 |
| 2,518,965 | Whitley | Aug. 15, 1950 |
| 2,562,043 | Kirkpatrick | July 24, 1951 |
| 2,578,314 | Muench | Dec. 11, 1951 |
| 2,597,620 | Coley | May 20, 1952 |
| 2,603,339 | Malhoit | July 15, 1952 |
| 2,649,187 | Eggleston | Aug. 18, 1953 |
| 2,679,115 | Bogaty | May 25, 1954 |
| 2,704,080 | Young | Mar. 15, 1955 |
| 2,704,158 | Long | Mar. 15, 1955 |
| 2,718,891 | Touton | Sept. 27, 1955 |
| 2,741,357 | Surico | Apr. 10, 1956 |

FOREIGN PATENTS

| | | |
|---|---|---|
| 707,214 | Great Britain | Apr. 4, 1954 |